US012166988B2

(12) United States Patent
Liu et al.

(10) Patent No.: US 12,166,988 B2
(45) Date of Patent: Dec. 10, 2024

(54) RESIDUAL COEFFICIENTS CODING

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Tianliang Fu, Beijing (CN); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 263 days.

(21) Appl. No.: 17/652,176

(22) Filed: Feb. 23, 2022

(65) Prior Publication Data

US 2022/0182630 A1 Jun. 9, 2022

Related U.S. Application Data

(63) Continuation of application No. PCT/CN2020/110780, filed on Aug. 24, 2020.

(30) Foreign Application Priority Data

Aug. 24, 2019 (WO) ................ PCT/CN2019/102412

(51) Int. Cl.
*H01L 29/94* (2006.01)
*H04N 19/129* (2014.01)
(Continued)

(52) U.S. Cl.
CPC ......... *H04N 19/129* (2014.11); *H04N 19/176* (2014.11); *H04N 19/18* (2014.11); *H04N 19/70* (2014.11)

(58) Field of Classification Search
CPC .... H04N 19/129; H04N 19/176; H04N 19/18; H04N 19/70
See application file for complete search history.

(56) References Cited

U.S. PATENT DOCUMENTS 8,902,976 B2 12/2014 He et al.
10,154,258 B2 12/2018 He et al.
(Continued)

FOREIGN PATENT DOCUMENTS

CA 3060035 A1 * 10/2018 ........... H04N 19/119
CN 104041040 A 9/2014
(Continued)

OTHER PUBLICATIONS

Bross et al. "Versatile Video Coding (Draft 6)," oint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.
(Continued)

*Primary Examiner* — Joseph Suh
(74) *Attorney, Agent, or Firm* — Conley Rose, P.C.

(57) ABSTRACT

Video processing methods, devices, and systems are provided. In one example aspect, a method of video processing includes performing a conversion between a current block of a video and a coded representation of the video. The current block has a width W and a height H and includes an allowable scanning region that includes non-zero transform coefficients that are coded in the coded representation according to a scanning order. The allowable scanning
(Continued)

region is restricted to a portion of the current block according to a rule that specifies that a bottom-right corner position of the allowable scanning region is different than a bottom-right corner position of the current block.

14 Claims, 16 Drawing Sheets

(51) Int. Cl.

| | |
|---|---|
| ***H04N 19/176*** | (2014.01) |
| ***H04N 19/18*** | (2014.01) |
| ***H04N 19/70*** | (2014.01) |

(56) References Cited

U.S. PATENT DOCUMENTS

| | | | | |
|---|---|---|---|---|
| 10,230,983 | B2 | 3/2019 | Liu et al. | |
| 10,382,768 | B2 | 8/2019 | Huang et al. | |
| 10,404,999 | B2 | 9/2019 | Liu et al. | |
| 10,506,254 | B2 | 12/2019 | Li et al. | |
| 10,582,203 | B2 | 3/2020 | Huang et al. | |
| 10,609,414 | B2 | 3/2020 | Zhang et al. | |
| 10,652,576 | B2 | 5/2020 | Li et al. | |
| 10,869,062 | B2 | 12/2020 | Eglimez et al. | |
| 2005/0206741 | A1* | 9/2005 | Raber | H04N 5/907 386/E5.067 |
| 2012/0230402 | A1* | 9/2012 | Auyeung | H04N 19/13 375/E7.243 |
| 2013/0003835 | A1 | 1/2013 | Rohals et al. | |
| 2014/0348227 | A1* | 11/2014 | Lee | H04N 19/463 375/240.03 |
| 2018/0014017 | A1 | 1/2018 | Li et al. | |
| 2018/0176581 | A1* | 6/2018 | Huang | H04N 19/119 |
| 2020/0228834 | A1 | 7/2020 | Li et al. | |
| 2021/0385439 | A1 | 12/2021 | Zhu et al. | |
| 2021/0385498 | A1 | 12/2021 | Zhang et al. | |
| 2022/0007057 | A1 | 1/2022 | Liu et al. | |

FOREIGN PATENT DOCUMENTS

| | | | |
|---|---|---|---|
| CN | 109417626 | A | 3/2019 |
| EP | 3509301 | A1 | 7/2019 |
| WO | 2018190594 | A1 | 10/2018 |
| WO | 2019027523 | A1 | 2/2019 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Coban et al. "CE7-Related: Coefficient Scanning and Last Position Coding for TUs of Greater than 32 Width or Height," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0257, 2019.

"Information Technology—High Efficiency Coding and Media Delivery in Heterogeneous Environments—Part 2: High Efficiency Video Coding" Apr. 20, 2018, ISO/DIS 23008, 4th Edition.

Karczewicz et al. "Geometry Transformation-based Adaptive In-Loop Filter," 2016 IEEE, Picture Coding Symposium (PCS), 2016.

Yoo et al. "Non-CE7: Residual Rearrangement for Transform Skipped Blocks," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0278, 2019.

https://vcgit.hhi.fraunhofer.de/jvet/VVCSoftware_VTM/tags/VTM-6.0.

International Search Report and Written Opinion from International Patent Application No. PCT/CN2020/110780 dated Nov. 26, 2020 (13 pages).

* cited by examiner

| | | | | | | | | | | | | | | | | |
|---|---|---|---|---|---|---|---|---|---|---|---|---|---|---|---|---|
| group_idx | 0 | 1 | 2 | 3 | 4 | | 5 | | 6 | | | | 7 | | | |
| BRScanPosX/BRScanPosY | 0 | 1 | 2 | 3 | 4 | 5 | 6 | 7 | 8 | 9 | 10 | 11 | 12 | 13 | 14 | 15 |
| group_idx | 8 | | | | | | | | 9 | | | | | | | |
| BRScanPosX/BRScanPosY | 16 | 17 | 18 | 19 | 20 | 21 | 22 | 23 | 24 | 25 | 26 | 27 | 28 | 29 | 30 | 31 |
| group_idx | 10 | | | | | | | | | | | | | | | |
| BRScanPosX/BRScanPosY | 32 | 33 | 34 | 35 | 36 | 37 | 38 | 39 | 40 | 41 | 42 | 43 | 44 | 45 | 46 | 47 |
| group_idx | 11 | | | | | | | | | | | | | | | |
| BRScanPosX/BRScanPosY | 48 | 49 | 50 | 51 | 52 | 53 | 54 | 55 | 56 | 57 | 58 | 59 | 60 | 61 | 62 | 63 |

FIG. 6

RESIDUAL COEFFICIENTS CODING

CROSS REFERENCE TO RELATED APPLICATIONS

This application is a continuation of International Patent Application No. PCT/CN2020/110780, filed on Aug. 24, 2020, which claims the priority to and benefits of International Patent Application No. PCT/CN2019/102412, filed on Aug. 24, 2019. All the aforementioned patent applications are hereby incorporated by reference in their entireties.

TECHNICAL FIELD

This patent document relates to video coding techniques, decoding techniques, devices, and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

This document discloses methods, systems, and devices related to the use of affine motion compensation in video coding and decoding.

In one representative aspect, a video processing method is disclosed. The method includes performing a conversion between a current block of a video and a coded representation of the video. The current block has a width W and a height H and the current block comprises an allowable scanning region that includes non-zero transform coefficients that are coded in the coded representation according to a scanning order. The allowable scanning region is restricted to a portion of the current block according to a rule that specifies that a bottom-right corner of the allowable scanning region is different than a bottom-right corner of the current block.

In another representative aspect, a video processing method is disclosed. The method includes performing a conversion between a current block of a video and a coded representation of the video. The current block is coded in the coded representation based on non-zero transform coefficients in a portion of the current block in a scanning order. The portion of the current block that includes the non-zero transform coefficients has a non-rectangular shape.

In another representative aspect, a video processing method is disclosed. The method includes performing a conversion between a current block of a video and a coded representation of the video. The current block is coded in the coded representation based on non-zero transform coefficients in a scanning order in a portion of the current block. The coded representation conforms to a format rule that defines that a scanning order index in the coded representation representing the scanning order indicates the portion of the current block.

In another representative aspect, a video processing method is disclosed. The method includes performing a conversion between a current block of a video and a coded representation of the video. The current block is coded in the coded representation based on non-zero transform coefficients in a scanning order in a portion of the current block. The coded representation conforms to a format rule that defines that a syntax element in the coded representation representing a specific position in the current block indicates the portion of the current block. The portion of the current block is further indicated by a characteristic associated with the specific position in the current block.

In another representative aspect, a video processing method is disclosed. The method includes performing a conversion between a current block of a video and a coded representation of the video. An indication of whether a coding group of the current block includes non-zero transform coefficients is signaled in the coded representation. The coding group represents consecutive transform coefficients to be scanned during the conversion according to a scanning order.

In yet another representative aspect, a video processing method is disclosed. The method includes performing a conversion between a current video block and a coded representation of the current video block, wherein, during the conversion one or more regions including transform coefficients located in non-overlapping sub-blocks of the current video block are to be scanned according to a scanning order.

In yet another representative aspect, another video processing method is disclosed. The method includes performing a conversion between a current video block and a coded representation of the current video block, wherein, during the conversion one or more regions including transform coefficients located in non-overlapping sub-blocks of the current video block are to be scanned according to a scanning order; and providing, in the coded representation, an indication of whether a sub-block in the sub-blocks scanned according to the scanning order correspond to a zero value transform coefficient.

In yet another representative aspect, another video processing method is disclosed. The method includes performing a conversion between a current video block and a coded representation of the current video block, wherein, during the conversion one or more regions including transform coefficients located in non-overlapping sub-blocks of the current video block are to be scanned according to a scanning order; and restricting a region to be scanned to an allowable range of values.

In yet another representative aspect, a video processing method is disclosed. The method includes performing a conversion between a current video block and a coded representation of the current video block, wherein, during the conversion one or more regions including transform coefficients located in non-overlapping sub-blocks of the current video block are to be scanned according to a scanning order represented by a scanning order index; restricting a region to be scanned to an allowable range of values; wherein the one or more regions to be scanned are defined by a position parameter and other parameters; and jointly coding, by a coding method, the scanning order index and the allowable range of values.

In yet another representative aspect, a video processing method is disclosed. The method includes performing a conversion between a current video block and a coded representation of the current video block, wherein, during the conversion one or more regions including transform coefficients located in non-overlapping sub-blocks of the current video block are to be scanned according to a scanning order represented by a scanning order index; restricting a region to be scanned to an allowable range of values; wherein the one or more regions to be scanned are defined by a position parameter and other parameters; and jointly coding, by a coding method, the scanning order index and the allowable range of values.

In yet another representative aspect, the various techniques described herein may be embodied as a computer program product stored on a non-transitory computer readable media. The computer program product includes program code for carrying out the methods described herein.

In yet another representative aspect, a video decoder apparatus may implement a method as described herein.

The details of one or more implementations are set forth in the accompanying attachments, the drawings, and the description below. Other features will be apparent from the description and drawings, and from the claims.

BRIEF DESCRIPTION OF THE DRAWINGS

FIG. 6 shows examples of bottom-right position scanning region groups (BRScanPosX, BRScanPosY).

DETAILED DESCRIPTION

The present document provides several techniques that can be embodied into digital video encoders and decoders. Section headings are used in the present document for clarity of understanding and do not limit scope of the techniques and embodiments disclosed in each section only to that section.

1. Summary

The disclosed technology is related to video coding technologies. Specifically, it is related to residual coding in video coding. It may be applied to the existing video coding standard like AVS, AVS2, HEVC, or the standard (e.g., Versatile Video Coding, AVS3) to be finalized. It may be also applicable to future video coding standards or video codecs.

2. Introduction

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Coding Flow of a Typical Video Codec

Figure 1:
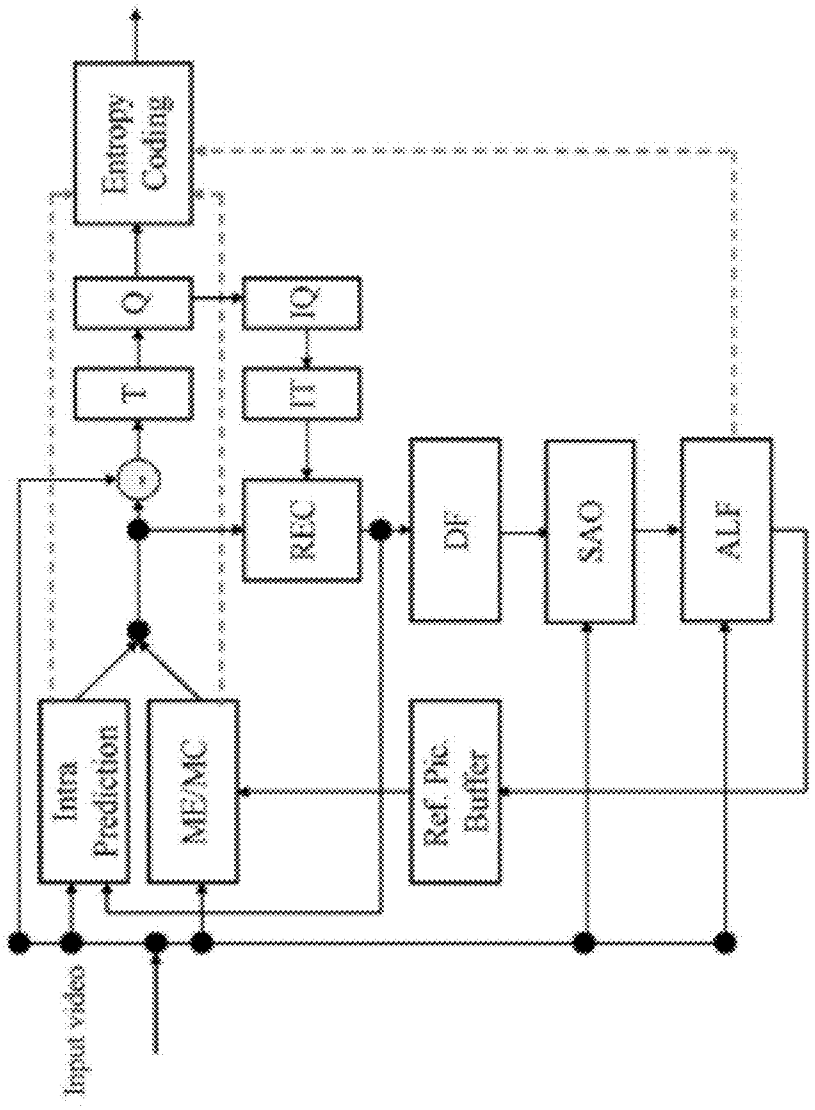
FIG. 1 shows an example of an encoder block.

FIG. 1 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.2 Residual Coding in VVC

2.2.1 Coefficients Coding of Transform-Applied Blocks

In HEVC, transform coefficients of a coding block are coded using non-overlapped coefficient groups (CG, or subblocks), and each CG contains the coefficients of a 4×4 block of a coding block. The CGs inside a coding block, and the transform coefficients within a CG, are coded according to pre-defined scan orders.

Figure 2:
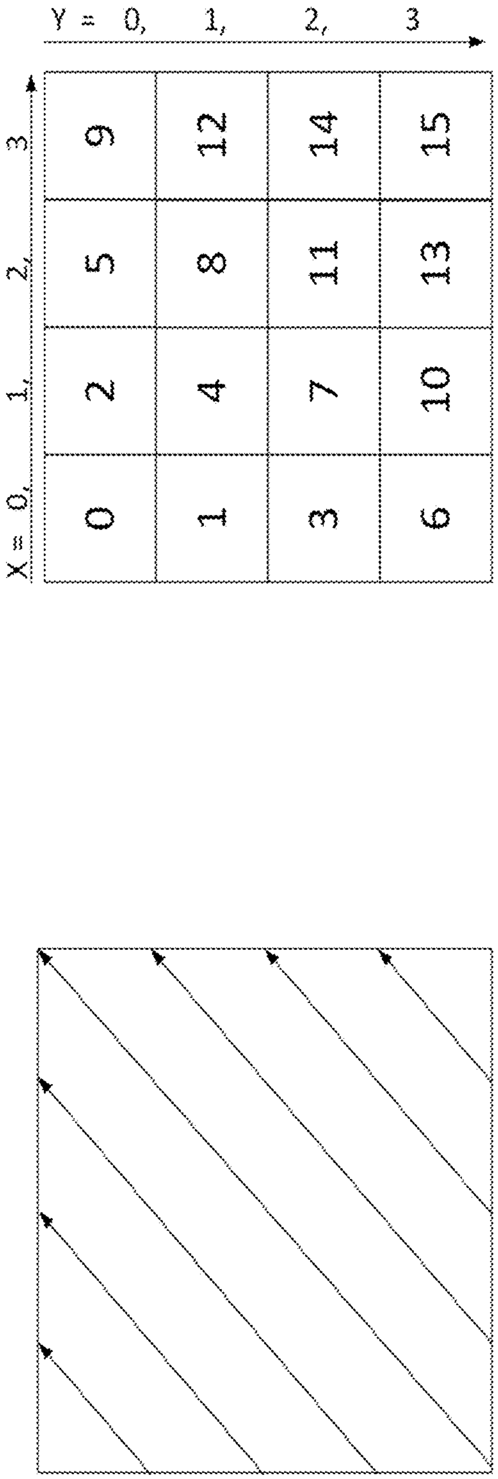
FIG. 2 shows an example diagonal up-right scan order for a 4×4 block.
Figure 3:
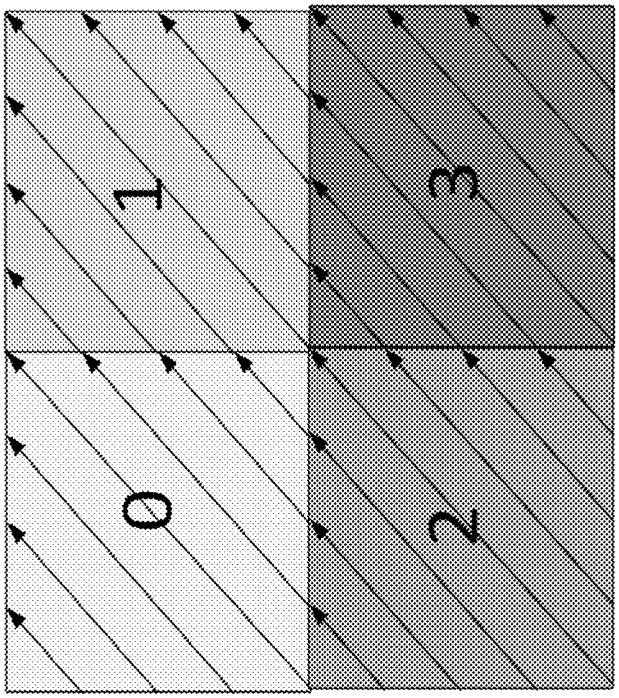
FIG. 3 shows an example diagonal up-right scan order for a 8×8 block.

The CGs inside a coding block, and the transform coefficients within a CG, are coded according to pre-defined scan orders. Both CG and coefficients within a CG follows the diagonal up-right scan order. An example for 4×4 block and 8×8 scanning order is depicted in FIG. 2 and FIG. 3, respectively.

Note that the coding order is the reversed scanning order (i.e., decoding from CG3 to CG0 in FIG. 3), when decoding one block, the last non-zero coefficient's coordinate (denoted by (LastPosX, LastPosY) is firstly decoded.

The coding of transform coefficient levels of a CG with at least one non-zero transform coefficient may be separated into multiple scan passes. In the VVC 3, for each CG, the regular coded bins and the bypass coded bins are separated in coding order; first all regular coded bins for a subblock are transmitted and, thereafter, the bypass coded bins are transmitted. The transform coefficient levels of a subblock are coded in five passes over the scan positions as follows:

- Pass 1: coding of significance (sig_flag), greater 1 flag (gt1_flag), parity (par_level_flag) and greater 2 flags (gt2_flag) is processed in coding order. If sig_flag is equal to 1, first the gt1_flag is coded (which specifies whether the absolute level is greater than 1). If gt1_flag is equal to 1, the par_flag is additionally coded (it specifies the parity of the absolute level minus 2).
- Pass 2: coding of remaining absolute level (remainder) is processed for all scan positions with gt2_flag equal to 1 or gt1_flag equal to 1. The non-binary syntax element is binarized with Golomb-Rice code and the resulting bins are coded in the bypass mode of the arithmetic coding engine.
- Pass 3: absolute level (absLevel) of the coefficients for which no sig_flag is coded in the first pass (due to reaching the limit of regular-coded bins) are completely coded in the bypass mode of the arithmetic coding engine using a Golomb-Rice code.
- Pass 4: coding of the signs (sign_flag) for all scan positions with sig_coeff_flag equal to 1

It is guaranteed that no more than 32 regular-coded bins (sig_flag, par_flag, gt1_flag and gt2_flag) are encoded or decoded for a 4×4 subblock. For 2×2 chroma subblocks, the number of regular-coded bins is limited to 8.

The Rice parameter (ricePar) for coding the non-binary syntax element remainder (in Pass 3) is derived similar to HEVC. At the start of each subblock, ricePar is set equal to 0. After coding a syntax element remainder, the Rice parameter is modified according to predefined equation. For coding the non-binary syntax element absLevel (in Pass 4), the sum of absolute values sumAbs in a local template is determined. The variables ricePar and posZero are determined based on dependent quantization and sumAbs by a table look-up. The intermediate variable codeValue is derived as follows:

- If absLevel[k] is equal to 0, codeValue is set equal to posZero;
- Otherwise, if absLevel[k] is less than or equal to posZero, codeValue is set equal to absLevel[k]−1;
- Otherwise (absLevel[k] is greater than posZero), codeValue is set equal to absLevel[k].

The value of codeValue is coded using a Golomb-Rice code with Rice parameter ricePar.

2.2.2 Context Modeling for Coefficient Coding

Figure 4:
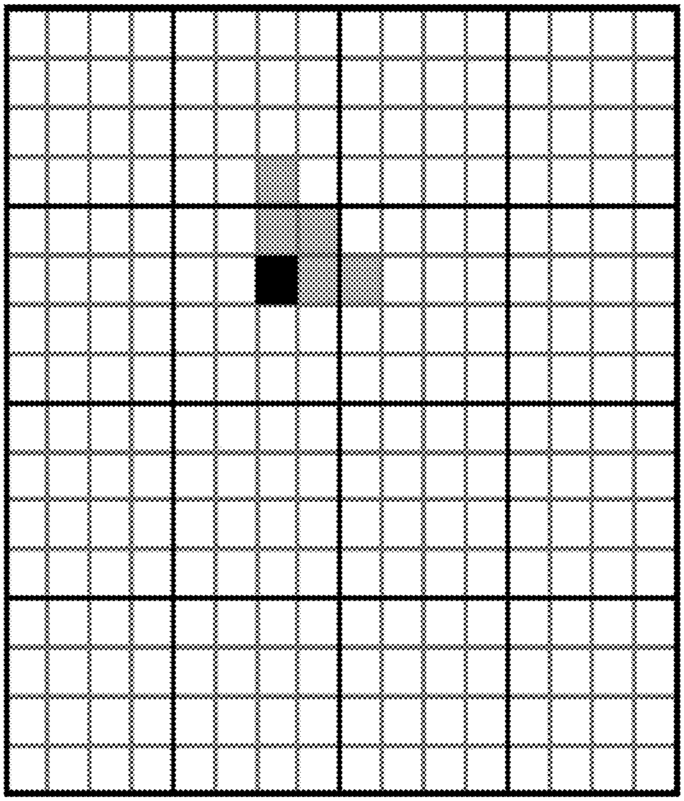
FIG. 4 shows an example template used for selecting probability models.

The selection of probability models for the syntax elements related to absolute values of transform coefficient levels depends on the values of the absolute levels or partially reconstructed absolute levels in a local neighbourhood. The template used is illustrated in FIG. 4.

The selected probability models depend on the sum of the absolute levels (or partially reconstructed absolute levels) in a local neighbourhood and the number of absolute levels greater than 0 (given by the number of sig_coeff_flags equal to 1) in the local neighbourhood. The context modelling and binarization depends on the following measures for the local neighbourhood:

- numSig: the number of non-zero levels in the local neighbourhood;
- sumAbs1: the sum of partially reconstructed absolute levels (absLevel1) after the first pass in the local neighbourhood;
- sumAbs: the sum of reconstructed absolute levels in the local neighbourhood
- diagonal position (d): the sum of the horizontal and vertical coordinates of a current scan position inside the transform block Based on the values of numSig, sumAbs 1, and d, the probability models for coding sig_flag, par_flag, gt1_flag, and gt2_flag are selected. The Rice parameter for binarizing abs remainder is selected based on the values of sumAbs and numSig.

2.3 Residual Coding in AVS3 (Audio and Video Coding Standard 3)

2.3.1 Truncated Unary Binarization

Figure 5:
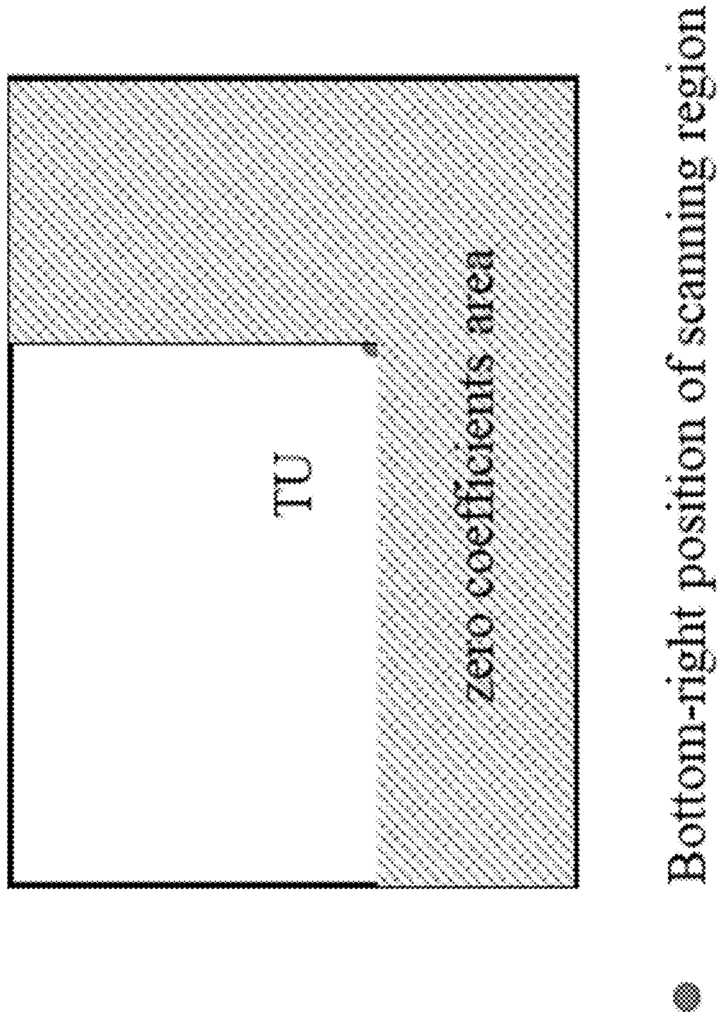
FIG. 5 shows an example area of zero coefficients along with a last non-zero position.

Different from VVC/HEVC, a bottom-right position of scanning region (BRScanPosX, BRScanPosY) is signaled. All coefficients with horizontal position greater than BRScanPosX are zero coefficients and all coefficients with vertical position greater than BRScanPosY are zero coefficients, as illustrated in FIG. 5. In addition, the coefficient at the coordinate (BRScanPosX, BRScanPosY) is not necessary to be a zero coefficient which is different from the last non-zero coefficient's coordinate denoted by (LastPosX, LastPosY). However, at least one of the coefficients with x-coordinate equal to BRScanPosX and the coefficients with y-coordinate equal to BRScanPosY shall be unequal to 0. Such a method is called Scan Region based Coefficient Coding (SRCC).

For the region that may contain non-zero coefficients, coefficients are scanned in reverse zig-zag order. Scanning starts from the bottom-right position. Each 16 consecutive coefficients in reverse scan order from the bottom-right position of scanning region is considered as a coding group (CG). The last CG (with the DC coefficient) may contain less than 16 coefficients.

In addition, coefficients within the CG are coded as follows.

- Pass 1: coding of significance (sig_flag) is processed in coding order.
- Pass 2: coding of greater 1 flags (coeff_abs_level_greater1_flag) and greater 2 flags (coeff_abs_level_greater2_flag) are processed in coding order. If sig_flag is equal to 1, first the coeff_abs_level_greater1_flag is coded (which specifies whether the absolute level is greater than 1). If coeff_abs_level_greater1_flag is equal to 1, the coeff_abs_level_greater2_flag is additionally coded (which specifies whether the absolute level is greater than 2).
- Pass 2: coding of remaining absolute level (coeff_abs_level remaining) is processed for all scan positions with coeff_abs_level_greater2_flag equal to 1.
- Pass 3: coding of sign (coeff_sign) of the coefficients for which sig_flag is equal to 1.

More specifically, the bottom-right position of scanning region (BRScanPosX, BRScanPosY) is coded as follows.

Pass 1: coding of group index (to indicate the range of BRScanPosX/BRScanPosY) is processed. group_idx denotes the group index of BRScanPosX/BRScanPosY and the groups are shown in FIG. 6.

The group index for BRScanPosX denoted by group_idx is binarized with the truncated binary method with the max value set to group_idx of (block width−1).

The group index for BRScanPosY denoted by group_idx is binarized with the truncated binary method with the max value set to group_idx of (block height−1).

First, several '1's are firstly coded and the number of '1's to be coded is set equal to group_idx. Then, if the group index of BRScanPosX is smaller than the group index of CUWidth minus 1 or if the group index of BRScanPosY is smaller than the group index of CUHeight minus 1, one '0' is coded to indicate the end of group index coding.

Pass 2: coding of offset within the group is processed. The offset of BRScanPosX/BRScanPosY in the group is coded to indicate the index of BRScanPosX/BRScanPosY within the group.

For example, if BRScanPosX is equal to 34, the group_idx equal to 10 is firstly coded. Afterwards, the offset compared to the first entry in the same group (i.e., 32) is then coded.

2.3.2 Syntax Table

The syntax table for the SRCC is shown in italicized text as follows:

```
Definition of transform block                                                   Descriptors

block(i, blockWidth, blockHeight, CuCtp, isChroma, isPcm, component) {
  M1 = blockWidth
  M2 = blockHeight
  for (x=0; x<M1; x++) {
    for (y=0; y<M2; y++)
      QuantCoeffMatrix[x][y] = 0
  }
  if (! isPcm) {
    if (CuCtp & (1 << i)) {
      if (SrccEnableFlag) {
        scan_region_x                                                            ae(v)
        scan_region_y                                                            ae(v)
        initScanOrder( ScanOrder, scan_region_x + 1, scan_region_y + 1, blockWidth )
        lastScanPos = ( (scan_region_x + 1) * (scan_region_y + 1) ) − 1
        lastSet = lastScanPos >> 4
        is_last_x = 0
        is_last_y = 0
        escapeDataPresent = 0
        for(i = lastset; i > = 0; i−−) {
          setPos = i << 4
          firstSigScanPos = 16
          lastSigScanPos = −1
          set_nz[i] = 0
          for( n = ( i = = lastSet ? lastScanPos − setPos : 15); n >= 0; n− −) {
            blkpos = ScanOrder[ setPos + n ];
            sx = blkpos & (blockWidth − 1)
            sy = blkpos >> log2width
            if(( sx = = 0 && sy = = scan_region_y && is_last_y = =0 ) | | (sy = = 0 &&
            sx = = scan_region_x && is_last_x = = 0 ) ) {
              sig_flag[ blkpos ] = 1
            }
            else {
              sig_flag[ blkpos ]                                                 ae(v)
            }
            if( sig_flag[ blkpos ] ) {
              if( sx = = scan_region_x ) is_last_x = 1
              if( sy = = scan_region_y ) is_last_y = 1
              if( lastSigScanPos = = −1 ) lastSigScanPos = n
              firstSigScanPos = n
              set_nz[i]++
            }
          }//for
          if (set_nz[i]) {
            escapeDataPresent = 0
            for( n = ( i = = lastSet ? lastScanPos − setPos : 15); n >= 0; n− − ) {
              blkpos = ScanOrder[ setPos + n ]
              if( sig_flag[ blkpos ] ) {
                coeff_abs_level_greater1_flag[ blkpos ]                          ae(v)
                if(coeff_abs_level_greater1_flag[ blkpos ]) {
                  coeff_abs_level_greater2_flag[ blkpos ]                        ae(v)
                  if( coeff_abs_level_greater2_flag[ blkpos ] ) {
                    escapeDataPresent = 1
                  }
                }
              }//if(sig_flag)
            }//for
          }//if(set_nz[i])
          if( escapeDataPresent ) {
            for( n =( i = = lastSet ? lastScanPos − setPos: 15); n >= 0; n− −) {
```

-continued

| Definition of transform block | Descriptors |
|---|---|
| blkpos = ScanOrder[ setPos + n ]; | |
| if( sig_flag[ blkpos ] ) { | |
| base_level = 3 | |
| abs_coef[ blkpos ] = 1 + coeff_abs_level_greater1_flag[ blkpos ] + coeff_abs_level_greater2_flag[ blkpos ] | |
| if( abs_coef[ blkpos ] = = base_level ) { | |
| ***coeff_abs_level_remaining[ blkpos ]*** | ue(v) |
| abs_coef[ blkpos ] += coeff_abs_level_remaining [ blkpos ] | |
| } | |
| } | |
| }//for | |
| }// if(escapeDataPresent) | |
| for( n = ( i = = lastSet ? lastScanPos − setPos : 15) ; n >= 0; n− −) { | |
| blkpos = ScanOrder[ setPos + n ] | |
| if( sig_flag[ blkpos ] ) { | |
| ***coeff_sign [ blkpos ]*** | ae(v) |
| } | |
| }//for | |
| } | |
| } | |
| else { | |
| blockWidth = isChroma ? blockWidth / 2 : blockWidth | |
| blockHeight = isChroma ? blockHeight / 2 : blockHeight | |
| idxW = Log(blockWidth) − 1 | |
| idxH = Log(blockHeight) − 1 | |
| NumOf Coeff = blockWidth * blockHeight | |
| NumNonZeroCoeff = 0 | |
| IstTuFlag = 0 | |
| ScanPosOffset = 0 | |
| do { | |
| coeff_run | ae(v) |
| coeff_level_minus1 | ae(v) |
| coeff_sign | ae(v) |
| AbsLevel = coeff_level_minus1 + 1 | |
| if (AbsLevel != 0) { | |
| NumNonZeroCoeff ++ | |
| } | |
| ScanPosOffset = ScanPosOffset + coeff_run | |
| PosxInBlk = InvScanCoeffInBlk[idxW][idxH][ScanPosOffset][0] | |
| PoslyInBlk = InvScanCoeffInBlk[idxW][idxH][ScanPosOffset][1] | |
| QuantCoeffMatrix[PosxInBlk][PosyInBlk] = coeff_sign ? −AbsLevel : AbsLevel | |
| if (ScanPosOffset >= NumOf Coeff − 1) { | |
| break | |
| } | |
| coeff_last | ae(v) |
| ScanPosOffset = ScanPosOffset + 1 | |
| } while (! coeff_last) | |
| } | |
| if (IstEnableFlag && DtSplitFlag) { | |
| IstTuFlag = NumNonZeroCoeff % 2 ? 1 : 0 | |
| } | |
| } | |
| } | |
| else { | |
| if ((component != 'COMPONENT_CHROMA' && i == 0) \|\| (component == 'COMPONENT_CHROMA' && i == 1)) { | |
| aec_ipcm_stuffing_bit | ae(v) |
| while (! byte_aligned()) { | |
| aec_byte_alignment_bit0 | f(1) |
| } | |
| } | |
| $M_1$ = isChroma ? blockWidth / 2 : blockWidth | |
| $M_2$= isChroma ? blockHeight / 2 : blockHeight | |
| xMin = Min(32, $M_1$) | |
| yMin = Min(32, $M_2$) | |

-continued

| Definition of transform block | Descriptors |
| --- | --- |
| for (yStep=0; yStep<M2/yMin; yStep++) { | |
| for (xStep=0; xStep<M1/xMin; xStep++) { | |
| for (y=0; y<yMin; y++) { | |
| for (x=0; x<xMin; x++) { | |
| pcm_coeff | f(n) |
| QuantCoeffMatrix[x+xStep*xMin][y + yStep*yMin] = pcm_coeff | |
| } | |
| } | |
| } | |
| } | |
| } | |
| } | |

3. Problems

1. The last non-zero coefficient of the CU/TU/PU may not be defined efficiently in AVS3.
2. Although the coefficients are grouped in CG, no flag is signaled to indicate whether the CG may have non-zero coefficients or not. Therefore, for every position, a significant flag has to be signaled to indicate whether it is non-zero or not. This may be inefficient.

4. Example Embodiments

The embodiments below should be considered as examples to explain general concepts. These embodiments should not be interpreted in a narrow way. Furthermore, these embodiments can be combined in any manner.

Figure 7:
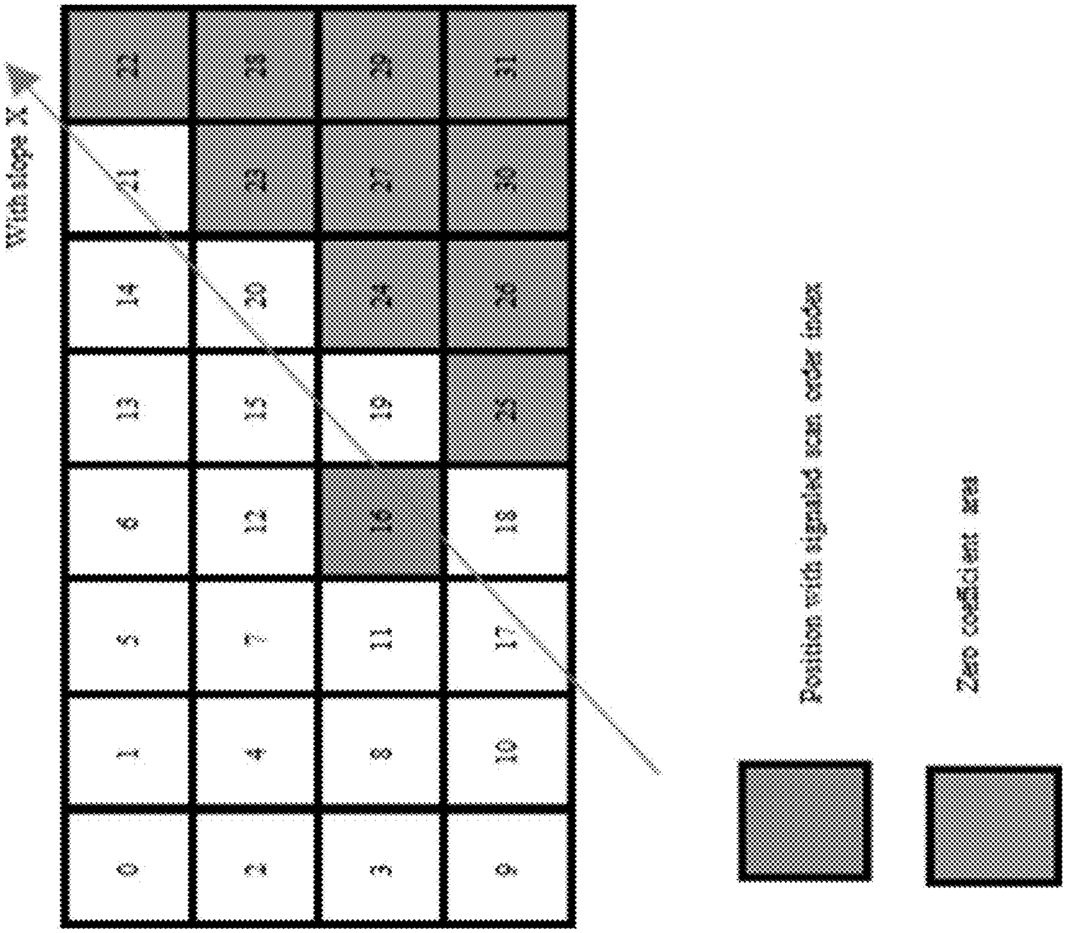
FIG. 7 shows an example of definition of zero coefficient area specified by a signaled scanning order index and a slope.

1. The scanning region in which coefficients are located shall be coded may be not in a rectangular shape.
   a. In one example, the scanning region may be a wedgelet.
   b. Alternatively, furthermore, the rest of the block excluding the scanning region are with zero coefficients which are not necessarily to be coded.
2. The scanning region of coefficients to be coded may be defined by a signaled scanning order index.
   a. The scan order may be the zig-zag scan order.
   b. The scan order may be the reversing zig-zag scan order.
   c. The scan order may be the raster scan order.
   d. The scan order may be the reversing raster scan order.
   e. In one example, the scanning order index may be mapped to the coordinators (scanX, scanY), and the coordinators may be signaled.
   f. In one example, coefficients with larger scanning order index than the signaled scanning order index may be enforced to zero coefficients.
      i. Alternatively, certain coefficients with larger scanning order index than the signaled scanning order index may be non-zero coefficients.
   g. In one example, all the coefficient with no greater than the signaled scanning order index may be coded.
      i. Alternatively, partial of coefficients with no greater than the signaled scanning order index may be coded and others with no greater than the signaled scanning order index may NOT be coded.
         1) In one example, certain coefficients with smaller scanning order index than the signaled scanning order index may be enforced to zero coefficients.
   h. The region of zero coefficients may be further dependent on the dimension (e.g., width or/and height) of the CU/PU/TU/block.
   i. The scanning order index may be coded by arithmetic coding with one or plural context models.
      i. Alternatively, the scanning order index may be coded by bypass coding.
3. The scanning region of coefficients to be coded may be defined by a specific position and other parameter(s).
   a. The specific position may be represented or coded by a coordinate (x, y).
      i. The position may be represented or coded by a scanning order index.
   b. In one example, the other parameters may comprise a slope X.
      i. For example, a line of slope X that passes though the specific position may be drawn, an example is shown in FIG. 7.
         1) For example, all coefficients on one side of the line (excluding on the line) may be enforced to be zero.
         2) For example, all coefficients on one side of the line (including on the line) may be enforced to be zero.
         3) For example, all coefficients below the line may be enforced to be zero.
      ii. For example, certain coefficients on the line may be enforced to be zero.
      iii. For example, for coefficients on the line, they may be zero if they are before the position in scanning order (e.g., diagonal order, zig-zag order or reversing zig-zag order, reversing diagonal order etc.).
   c. In one example, a set of slopes may be allowed and may be signaled in the SPS/PPS/slice header/tile group header etc.
      i. In one example, which slope is used may be decided and signaled at picture level, slice level, tile level, tile group level, CTU level, CU level, PU level or TU level.
   d. In one example, the used slope may be predefined.
      i. For example, the slope may be 45° and/or 135°.
   e. In one example, the used slope may be dependent on the CU/PU/TU/block dimension (e.g., width or/and height).
      i. For example, the slope may depend on the ratio between width and height. For example, slope=arctan(width/height) or slope=arctan(height/width) or slope=$\arctan^{-1}$ (width/height) or slope=$\arctan^{-1}$ (height/width)

f. In one example, the used slope may be dependent on the prediction modes (e.g., intra prediction mode, inter prediction mode, affine mode).
g. In one example, the region may be defined a non-linear line.
  i. The non-linear line may pass through the specific position.
  ii. For example, all coefficients on one side of the line (excluding on the line) may be enforced to be zero.
  iii. For example, all coefficients on one side of the line (including on the line) may be enforced to be zero.
  iv. For example, all coefficients on one side of the line (excluding on the line) may be coded (e.g., the white area in FIG. 7).
    1) Alternatively, all coefficients on one side of the line (including on the line) may be coded (e.g., the white area in FIG. 7).
    2) Alternatively, partial of the coefficients on one side of the line (including or excluding those on the line) may be coded (e.g., partial of the white area in FIG. 7).
  v. For example, the line may be comprised of piece-wise linear lines.

4. Indication of whether a CG (Coding Group) which represents consecutive coefficients in a scan order has non-zero coefficient may be signaled.
  a. The scan order may be the zig-zag scan order.
  b. The scan order may be the reversing zig-zag scan order.
  c. The scan order may be the raster scan order.
  d. The scan order may be the reversing raster scan order.
  e. The scan order may be reversed.
  f. In one example, the CG may be defined as N (N is a positive integer) consecutive coefficients (or positions) in scan order.
  g. In one example, the CG may be defined as N consecutive coefficients (or positions) in an order different from the coefficient scan order.
  h. In one example, a CG may contain N consecutive coefficients (or positions) in scan order or in an order different from the coefficient scan order.
  i. In one example, the first CG (in scan order) may start from a specific position. For example, the specific position may be the last non-zero position.
  j. In one example, last CG or the first CG (in scan order) may contain different number of coefficients compared with other CGs.
    i. In one example, the last CG (in scan order) may contain less than N coefficients (or positions) while each of other CGs contains N.
    ii. Alternatively, the first CG may contain less than N coefficients, and there are K*N (K is a non-negative integer) coefficients left in scan order after the first CG.
  k. In one example, the CU/PU/TU/block or the non-zero region may be split into sub-blocks with size sW*sH (e.g., 4*4, 4*8, 8*4 etc.), and a CG may be defined as certain positions within a sub-block.
    i. For example, a CG may be defined as every other rows of the sub-block.
    ii. For example, a CG may be defined as every other columns of the sub-block.
    iii. For example, a CG may be defined as the sub-block.
    iv. For example, a sub-block may be split into two parts by checkerboard pattern and each part is a CG.
  l. In one example, if the width/height of the non-zero region is not integer multiple of sW/sH, some CGs may have width/height less than sW/sH.
    i. For example, CG at the left boundary of the non-zero region may have width less than sW.
    ii. For example, CG at the right boundary of the non-zero region may have width less than sW.
    iii. For example, CG at the top boundary of the non-zero region may have height less than sH.
    iv. For example, CG at the bottom boundary of the non-zero region may have height less than sH.
  m. In one example, if the width/height of the non-zero region is not integer multiple of sW/sH, an enlarged region of the non-zero region may be used and split into CGs.
    i. For example, the enlarged region may be a region with width/height of integer multiple of sW/sH.
    ii. For example, difference between the width of the enlarged region and the width of the original non-zero region shall be less than sW.
    iii. For example, difference between the height of the enlarged region and the height of the original non-zero region shall be less than sH.
  n. In one example, N=8, 16.
  o. In one example, when a CG is indicated to only have zero coefficient, coefficient is not sent for any position within it.
  p. In one example, the CG defined here may only be used for signaling of whether there is non-zero coefficient within it.
    i. Alternatively, furthermore, the CG used for encoding the coefficients may not be changed.
  q. In one example, the indication may be coded by arithmetic coding with one or plural context models.
    i. In one example, the context model may be determined based on the indication of CG(s) previously coded 5. The allowed bottom-right position of scanning region within a block may be restricted to be unequal to the bottom-right position of the block. Suppose the block width and height are W, and H, respectively.
  a. The allowed range of the x-coordinate of the bottom-right position of scanning region (e.g., BRScanPosX) may be set to [a1, b1] wherein a1 and b1 are integers and b1 is smaller than (W−1).
  b. The allowed range of the y-coordinate of the bottom-right position of scanning region (e.g., BRScanPosY) may be set to [a2, b2] wherein a2 and b2 are integers and b2 is smaller than (H−1).
  c. The allowed range of the x-coordinate of the bottom-right position of scanning region (e.g., BRScanPosX) may be set to [a, b] wherein a and b are integers and b is smaller than (W−1), and the allowed range of the y-coordinate of the bottom-right position of scanning region (e.g., BRScanPosY) may be set to [c, d] wherein c and d are integers and b is smaller than (H−1).
    i. In one example, a and c are set to 0.
    ii. In one example, c and d are set to M−1 (e.g., M=32).
    iii. In one example, the above bullets may be invoked under the conditions of block dimensions, such as when W or H is greater than M.

d. In one example, the above bullets may be invoked under the conditions of block dimensions, such as when W or H is greater M.

e. In one example, it is a requirement of bitstream conformance that BRScanPosX and/or BRScanPosY should be less than M. For example, M=32.

f. Signaling of the bottom-right position of scanning region (BRScanPosX, BRScanPosY) may be dependent on the allowed range of BRScanPosX and/or BRScanPosY.

i. In one example, the group index of BRScanPosX may be binarized with the truncated unary method with the max value set to the group index of (min (M, block width)−1) (e.g., M=32).

ii. In one example, the group index of BRScanPosY may be binarized with the truncated unary method with the max value set to the group index of (min (M, block height)−1) (e.g., M=32).

iii. In one example, the range of group index is reduced from [0, 11] to [0, 9].

iv. Alternatively, BRScanPosX and/or BRScanPosY may be binarized with truncated binary method with max value set to the allowed range of BRScanPosX and/or BRScanPosY.

6. The x- and y-coordinate of the allowed bottom-right position of scanning region within a block or that corresponding to the position of the signaled scan index (in bullet 1-3) may be jointly coded.

a. In one example, BRScanPosX and BRScanPosY may be mapped to one value and then coded once.

b. Alternatively, predictive coding may be applied.

i. In one example, BRScanPosX may be firstly coded and BRScanPosY may be further coded based on the value of BRScanPosX.

ii. In one example, BRScanPosY may be firstly coded and BRScanPosX may be further coded based on the value of BRScanPosY.

c. In one example, the coding order of BRScanPosX and BRScanPosY may be adaptively changed.

i. In one example, which of the two to be coded firstly may depend on block dimension/coded information.

5. Additional Embodiments

This is on top of AVS3 Spec. The newly added parts are in bold italicized underlined font, and the deleted parts are indicated between [[ ]].

7.2.7 Transform Block

Scan region x-coordinate scan_region_x
Scan region y-coordinate scan_region_y

Scan_region_x and scan_region_y are used to describe the scan region of non-zero coefficients. The scan region is a rectangle with (0,0) as the top left corner and (scan_region_x, scan_region_y) as the bottom right corner. *It is a requirement of bitstream conformance that scan_region_x and scan_region_y should both be less than 32.* Their parsing process can be found in 8.3.

8.3.4.15 Inverse Binarization of Scan_Region_x

[[Denote Width as the width of current block. If one '0' is parsed before several '1's and the number of '1's is less than group_idx[width−1], pos_x is set equal to the number of '1's; otherwise, pos_x is set equal to group_idx[width−1]. The definition of group_idx can be found in appendix J.]]

*Denote Width as the width of current block. If one '0' is parsed before several '1's and the number of '1's is less than group_idx_w, pos_x is set equal to the number of '1's; otherwise, pos_x is set equal to group_idx[width − 1]. If width is greater than 32, group_idx_w is set equal to group_idx[31]; otherwise, group_idx_w is set equal to group_idx[width - 1]. The definition of group_idx can be found in appendix J.*

This is the first part of scan_region_x.

If pos_x is less than or equal to 3, synElVal is set equal to pos_x.

If pos_x is greater than 3, synElVal is set equal to min_in_group[pos_x]. The subsequent bins form the second part of scan_region_x and the inverse binarization of the second part is described as follows.

```
cnt = (pos_x − 2) >> 1
for (i = cnt − 1; i >= 0; i--)
{
   synElVal += val[binIdx] << i
   binIdx++
}
```

8.3.4.16 Inverse Binarization of Scan_Region_y

[[Denote Height as the height of current block. If one '0' is parsed before several '1's and the number of '1's is less than group_idx[height−1], pos_y is set equal to the number of '1's; otherwise, pos_y is set equal to group_idx[height−1]. The definition of group_idx can be found in appendix J.]]

*Denote Height as the height of current block. If one '0' is parsed before several '1's and the number of '1's is less than group_idx_h, pos_y is set equal to the number of '1's; otherwise, pos_y is set equal to group_idx[height - 1]. If height is greater than 32, group_idx_h is set equal to group_idx[31]; otherwise, group_idx_w is set equal to group_idx[height - 1]. The definition of group_idx can be found in appendix J.*

This is the first part of scan_region_y.

If pos_y is less than or equal to 3, synElVal is set equal to pos_y.

If pos_y is greater than 3, synElVal is set equal to min_in_group[pos_y]. The subsequent several bins form the second part of scan_region_y and the inverse binarization of the second part is described as follows.

```
cnt = (pos_y − 2) >> 1
for (i = cnt − 1; i >= 0; i--)
{
   synElVal += val[binIdx] << i
   binIdx++
}
```

Appendix J

A.1 prefix ctx prefix ctx[8]=0, 0, 0, 3, 6, 10, 15, 21

A.2 min_in_group min_in_group[[[14]] *10* ]={0,1,2,3,4,6,8,12,16,24 [[2,48,64, 96]]}

A.3 group_idx group_idx[[[64]] *32* ]={0,1,2,3,4,4,5,5,6,6,6,6,7,7,7,7,8,8,8, 8,8,8,8,8,9,9,9,9,9,9,9,9 [[,10,10,10,10,10,10,10,10,10,10, 10,10,10,10,10,10,11,11,11,11,11,11,11,11,11,11,11,11,11, 11,11,11]]}

Figure 8:
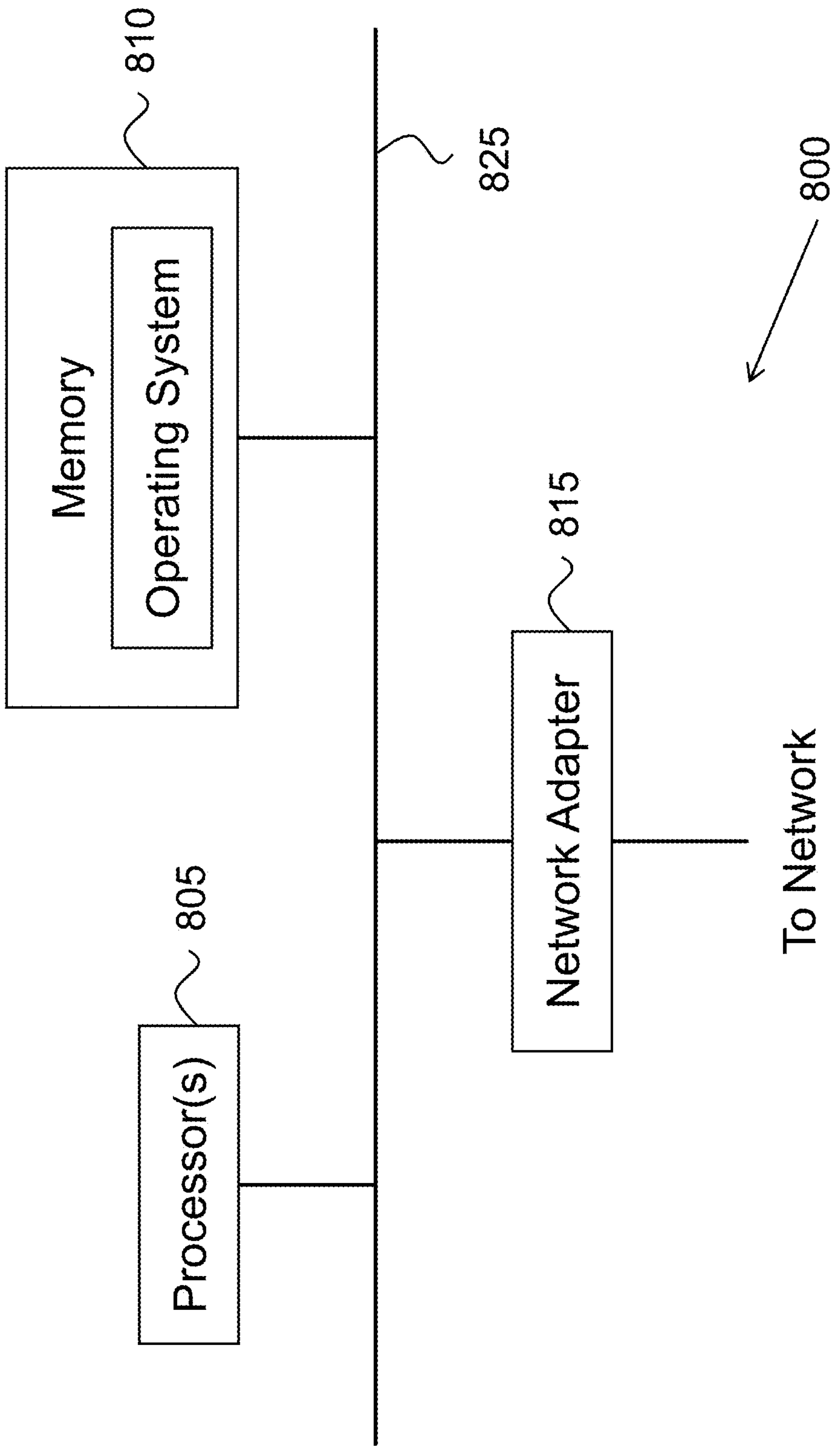
FIG. 8 is a block diagram illustrating an example of the architecture for a computer system or other control device that can be utilized to implement various portions of the presently disclosed technology.

FIG. 8 is a block diagram illustrating an example of the architecture for a computer system or other control device 800 that can be utilized to implement various portions of the presently disclosed technology. In FIG. 8, the computer system 800 includes one or more processors 805 and memory 810 connected via an interconnect 825. The interconnect 825 may represent any one or more separate physical buses, point to point connections, or both, connected by appropriate bridges, adapters, or controllers. The interconnect 825, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 805 may include central processing units (CPUs) to control the overall operation of, for example, the host computer. In certain embodiments, the processor(s) 805 accomplish this by executing software or firmware stored in memory 810. The processor(s) 805 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 810 can be or include the main memory of the computer system. The memory 810 represents any suitable form of random access memory (RAM), read-only memory (ROM), flash memory, or the like, or a combination of such devices. In use, the memory 810 may contain, among other things, a set of machine instructions which, when executed by processor 805, causes the processor 805 to perform operations to implement embodiments of the presently disclosed technology.

Also connected to the processor(s) 805 through the interconnect 825 is a (optional) network adapter 815. The network adapter 815 provides the computer system 800 with the ability to communicate with remote devices, such as the storage clients, and/or other storage servers, and may be, for example, an Ethernet adapter or Fiber Channel adapter.

Figure 9:
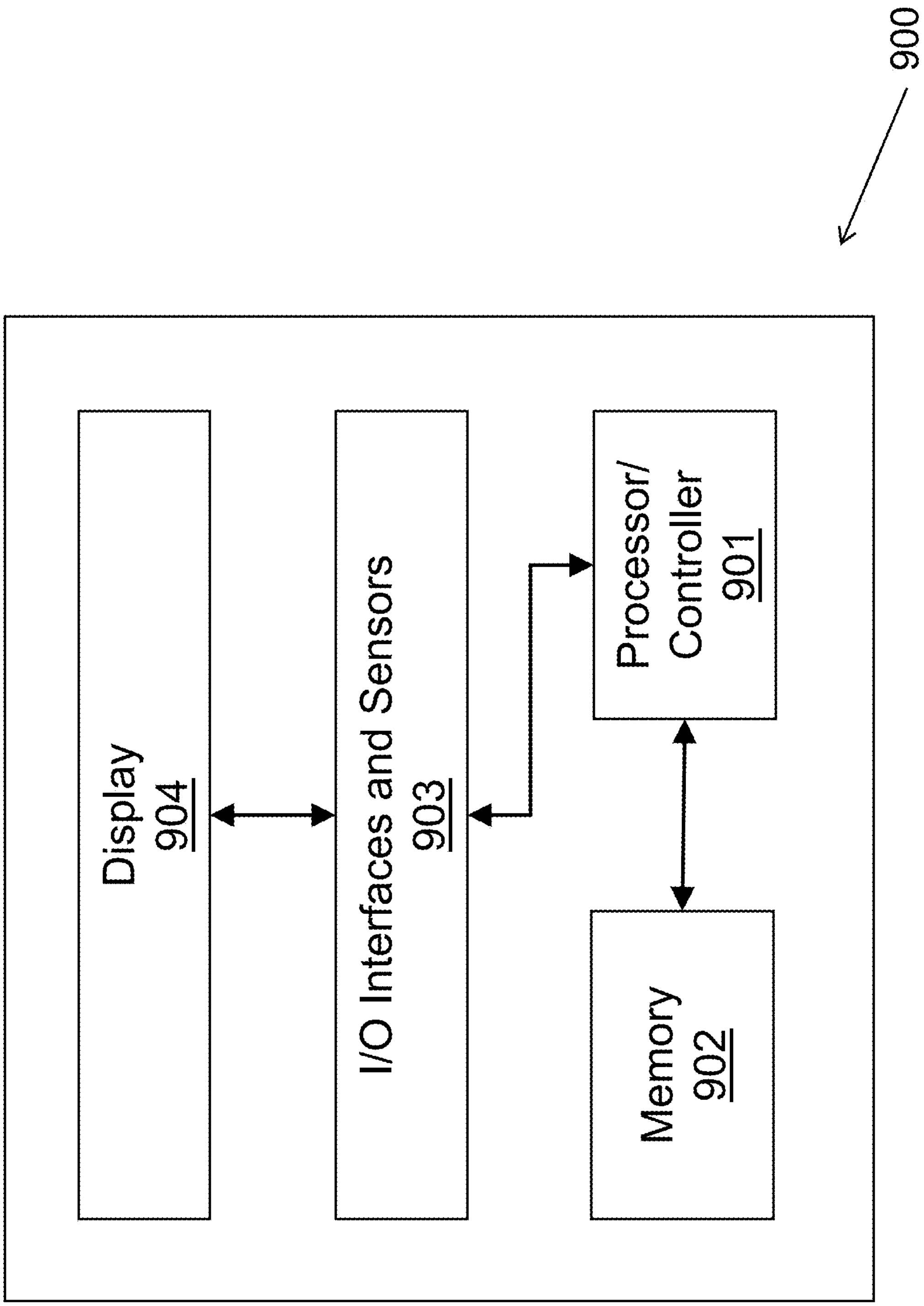
FIG. 9 shows a block diagram of an example embodiment of a mobile device that can be utilized to implement various portions of the presently disclosed technology.

FIG. 9 shows a block diagram of an example embodiment of a mobile device 900 that can be utilized to implement various portions of the presently disclosed technology. The mobile device 900 can be a laptop, a smartphone, a tablet, a camcorder, or other types of devices that are capable of processing videos. The mobile device 900 includes a processor or controller 901 to process data, and memory 902 in communication with the processor 901 to store and/or buffer data. For example, the processor 901 can include a central processing unit (CPU) or a microcontroller unit (MCU). In some implementations, the processor 901 can include a field-programmable gate-array (FPGA). In some implementations, the mobile device 900 includes or is in communication with a graphics processing unit (GPU), video processing unit (VPU) and/or wireless communications unit for various visual and/or communications data processing functions of the smartphone device. For example, the memory 902 can include and store processor-executable code, which when executed by the processor 901, conFIG.s the mobile device 900 to perform various operations, e.g., such as receiving information, commands, and/or data, processing information and data, and transmitting or providing processed information/data to another device, such as an actuator or external display. To support various functions of the mobile device 900, the memory 902 can store information and data, such as instructions, software, values, images, and other data processed or referenced by the processor 901. For example, various types of Random Access Memory (RAM) devices, Read Only Memory (ROM) devices, Flash Memory devices, and other suitable storage media can be used to implement storage functions of the memory 902. In some implementations, the mobile device 900 includes an input/output (I/O) unit 903 to interface the processor 901 and/or memory 902 to other modules, units or devices. For example, the I/O unit 903 can interface the processor 901 and memory 902 with to utilize various types of wireless interfaces compatible with typical data communication standards, e.g., such as between the one or more computers in the cloud and the user device. In some implementations, the mobile device 900 can interface with other devices using a wired connection via the I/O unit 903. The mobile device 900 can also interface with other external interfaces, such as data storage, and/or visual or audio display devices 904, to retrieve and transfer data and information that can be processed by the processor, stored in the memory, or exhibited on an output unit of a display device 904 or an external device. For example, the display device 904 can display a video frame modified based on the MVPs in accordance with the disclosed technology.

Figure 10:
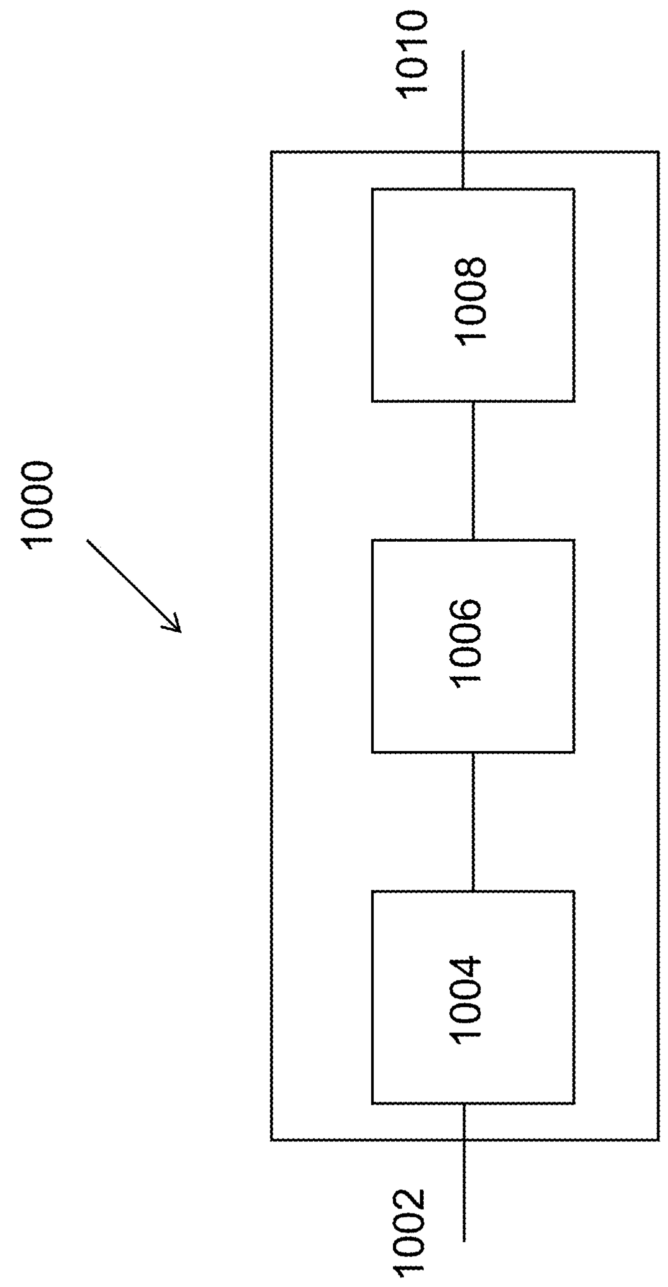
FIG. 10 is a block diagram of an example video processing system in which disclosed techniques may be implemented.

FIG. 10 is a block diagram showing an example video processing system 1000 in which various techniques disclosed herein may be implemented. Various implementations may include some or all of the components of the system 1000. The system 1000 may include input 1002 for receiving video content. The video content may be received in a raw or uncompressed format, e.g., 8 or 10 bit multi-component pixel values, or may be in a compressed or encoded format. The input 10002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1000 may include a coding component 1004 that may implement the various coding or encoding methods described in the present document. The coding component 1004 may reduce the average bitrate of video from the input 1002 to the output of the coding component 1004 to produce a coded representation of the video. The coding techniques are therefore sometimes called video compression or video transcoding techniques. The output of the coding component 1004 may be either stored, or transmitted via a communication connected, as represented by the component 1006. The stored or communicated bitstream (or coded) representation of the video received at the input 1002 may be used by the component 1008 for generating pixel values or displayable video that is sent to a display interface 1010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 11:
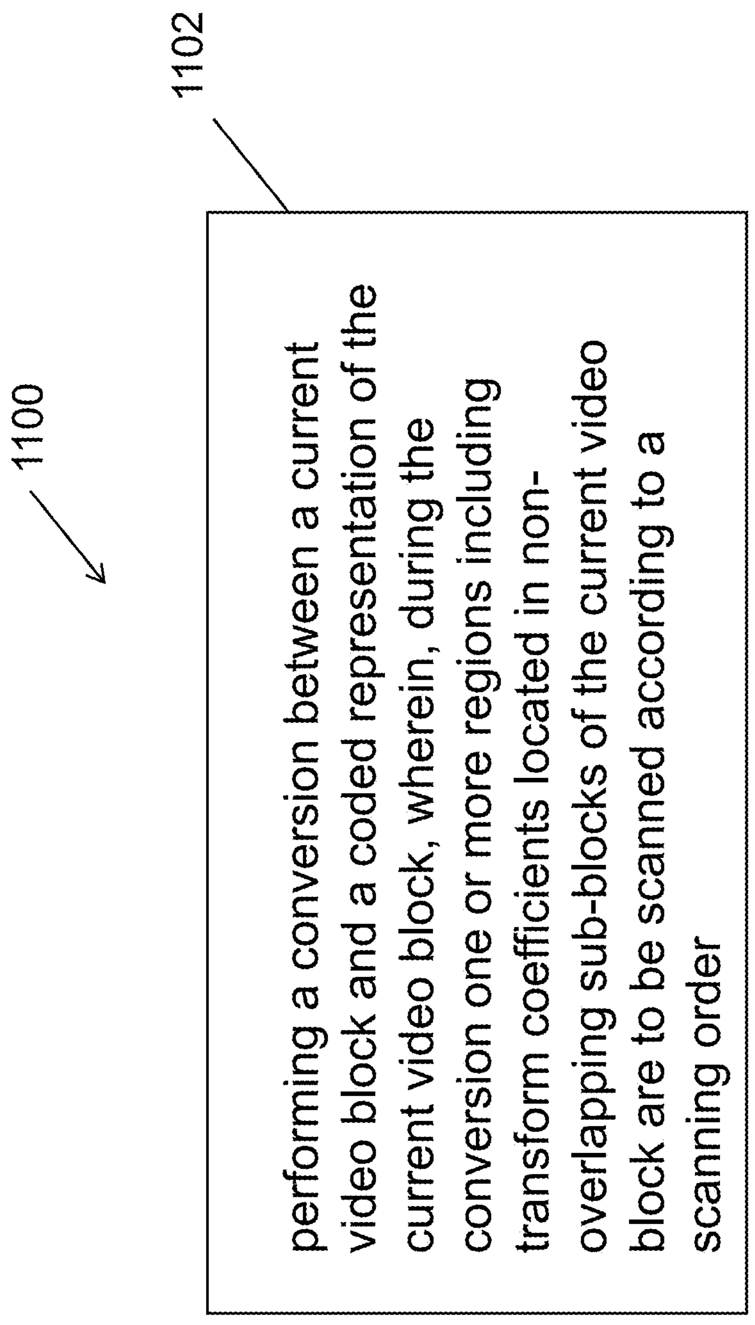
FIG. 11 is a flowchart for an example method of video processing.

FIG. 11 is a flowchart for an example method of video processing. The method includes performing (1102) a conversion between a current video block and a coded representation of the current video block, wherein, during the conversion one or more regions including transform coefficients located in non-overlapping sub-blocks of the current video block are to be scanned according to a scanning order.

Some embodiments are now presented in clause-based format.

1. A method of video processing, comprising:

performing a conversion between a current video block and a coded representation of the current video block, wherein, during the conversion one or more regions including transform coefficients located in non-overlapping sub-blocks of the current video block are to be scanned according to a scanning order.

2. The method of clause 1, wherein the one or more regions are arbitrarily shaped.

3. The method of clause 2, wherein the one or more regions are shaped liked a wedgelet.

4. The method of clause 1, wherein the transform coefficients are non-zero valued.

5. The method of clause 1, wherein regions excluding the one or more regions are coded with zero coefficients.

6. The method of clause 1, wherein the order is defined by a signaling order index.

7. The method of clause 6, wherein the signaling order index specifies that the order of scanning is one of: a zig-zag scan, a reverse zig-zag scan, a raster scan, or a reverse raster scan.

8. The method of clause 6, wherein the signaling order index is expressed as a two-dimensional coordinate denoted (scanX, scanY).

9. The method of one or more of clauses 6-8, wherein the signaling order index is implicitly or explicitly included in the bitstream representation.

10. The method of one or more of clauses 6-9, wherein at least a subset of transform coefficients are selectively coded or uncoded, based in part on whether the transform coefficients are greater or lesser than the signaling order index.

11. The method of clause 10, wherein the uncoded transform coefficients are zero-valued.

12. The method of clause 11, wherein a region where the zero-valued transform coefficients are located are based on a dimension of the current video block.

13. The method of clause 11, wherein a region where the zero-valued transform coefficients are located are based on a dimension of the sub-blocks of the current video block.

14. The method of one or more of clauses 6-13, wherein the scanning order index is expressed using a coding method.

15. The method of clause 14, wherein the coding method is one of: an arithmetic coding method with one or plural context models or a bypass coding method.

16. The method of clause 1, wherein the one or more regions to be scanned are defined by a position parameter and other parameters.

17. The method of clause 15, wherein the position parameter is a position of a point represented by a two dimensional coordinate (x,y) and/or the scanning order index.

18. The method of clause 16, wherein a parameter in the other parameters corresponds to a slope of a straight line passing through the point.

19. The method of clause 17, wherein at least a subset of the transform coefficients in regions spatially located above, below, or on the straight line are assigned zero values.

20. The method of clause 17, wherein at least a subset of the transform coefficients in regions spatially located prior to the point in the scanning order are assigned zero values.

21. The method of clause 19, wherein the scanning order is one of: a diagonal order, a zig-zag order, a reverse zig-zag order, or a reverse diagonal order.

22. The method of clause 17, wherein a set of slopes are included in the other parameters.

23. The method of one or more of clauses 17-21, wherein the slope is implicitly or explicitly included in the bitstream representation.

24. The method of clause 22, wherein the slope is included in a picture level, a slice level, a tile level, a tile group level, a CTU level, a CU level, a PU level, or a TU level.

25. The method of one or more of clauses 17-23, wherein the slope is based in part on a dimension of the current video block.

26. The method of one or more of clauses 17-23, wherein the slope is based in part on a coding mode of the current video block.

27. The method of one or more of clauses 16, wherein the one or more regions is represented by a non-linear curve passing through the point.

28. The method of clause 26, wherein at least a subset of the transform coefficients in regions spatially located above, below, or on the non-linear curve are assigned zero values.

29. A method of video processing, comprising:

performing a conversion between a current video block and a coded representation of the current video block, wherein, during the conversion one or more regions including transform coefficients located in non-overlapping sub-blocks of the current video block are to be scanned according to a scanning order; and providing, in the coded representation, an indication of whether a sub-block in the sub-blocks scanned according to the scanning order correspond to a zero value transform coefficient.

30. The method of clause 29, wherein the indication is defined as consecutive positions in the scanning order.

31. The method of clause 29, wherein the indication is defined as consecutive positions different from the scanning order.

32. The method of clause 29, wherein the indication is defined as a location of a coding group with a last non-zero coefficient.

33. The method of clause 29, wherein the scanning order is one of: a zig-zag scan, a reverse zig-zag scan, a raster scan, or a reverse raster scan.

34. The method of clause 32, wherein the coding group can correspond to a different number of transform coefficients in comparison to another coding group.

35. The method of any of clauses 29-34, wherein the coding group includes at least a portion of the sub-block.

36. The method of clause 35, wherein a dimension of the sub-block is different than a dimension of the coding group.

37. A method of video processing, comprising:

performing a conversion between a current video block and a coded representation of the current video block, wherein, during the conversion one or more regions including transform coefficients located in non-overlapping sub-blocks of the current video block are to be scanned according to a scanning order; and restricting a region to be scanned to an allowable range of values.

38. The method of clause 37, wherein the allowable range of values is such that a bottom right position of the region to be scanned is unequal to a bottom right position of the current video block.

39. The method of clause 38, wherein the allowable range of values is specified in terms of an x-coordinate of a bottom-right position of the region to be scanned, and expressed as [a1, b1], wherein a1 and b1 are integers and b1 is smaller than (W−1), and wherein W is a width of the current video block.

40. The method of clause 38, wherein the allowable range of values is specified in terms of a y-coordinate of a bottom-right position of the region to be scanned, and expressed as [a2, b2], wherein a2 and b2 are integers and b2 is smaller than (H−1), and wherein H is a height of the current video block.

41. The method of clause 38, wherein the allowable range of values is specified in terms of an x-coordinate and a y-coordinate of a bottom-right position of the region to be scanned, wherein the x-coordinate is expressed as [a, b], wherein a and b are integers and b is smaller than (W−1), and wherein the y-coordinate is expressed as [c, d], wherein c and d are integers and b is smaller than (H−1), and wherein W, H are a width and a height of the current video block.

42. The method of one or more of clauses 37-41, wherein the region to be scanned is explicitly or implicitly included in the coded representation.

43. A method of video processing, comprising:

performing a conversion between a current video block and a coded representation of the current video block, wherein, during the conversion one or more regions including transform coefficients located in non-overlapping sub-blocks of the current video block are to be scanned according to a scanning order represented by a scanning order index;

restricting a region to be scanned to an allowable range of values; wherein the one or more regions to be scanned are defined by a position parameter and other parameters; and jointly coding, by a coding method, the scanning order index and the allowable range of values.

44. The method of clause 43, wherein the coding method includes a predictive coding method.

45. The method of clause 43, wherein the allowable range of values is such that a bottom right position of the region to be scanned is unequal to a bottom right position of the current video block.

46. The method of clause 43, wherein the allowable range of values is specified in terms of an x-coordinate of a bottom-right position of the region to be scanned, and expressed as [a1, b1], wherein a1 and b1 are integers and b1 is smaller than (W−1), and wherein W is a width of the current video block.

47. The method of clause 43, wherein the allowable range of values is specified in terms of a y-coordinate of a bottom-right position of the region to be scanned, and expressed as [a2, b2], wherein a2 and b2 are integers and b2 is smaller than (H−1), and wherein H is a height of the current video block.

48. The method of clause 43, wherein the allowable range of values is specified in terms of an x-coordinate and a y-coordinate of a bottom-right position of the region to be scanned, wherein the x-coordinate is expressed as [a, b], wherein a and b are integers and b is smaller than (W−1), and wherein the y-coordinate is expressed as [c, d], wherein c and d are integers and b is smaller than (H−1), and wherein W, H are a width and a height of the current video block.

49. The method of any of clauses 43-48, wherein the jointly coding includes determining an order of values included in the allowable range of values.

50. The method of clause 49, wherein the order of values is based at least in part on a dimension of the current video block.

51. The method of clause 49, wherein determining the order of values includes determining a mapping of the values.

52. A video decoding apparatus comprising a processor conFIG.d to implement a method recited in one or more of clauses 1 to 51.

53. A video encoding apparatus comprising a processor conFIG.d to implement a method recited in one or more of clauses 1 to 51.

54. A computer program product having computer code stored thereon, the code, when executed by a processor, causes the processor to implement a method recited in any of clauses 1 to 51.

55. A method, apparatus or system described in the present document.

Figure 12:
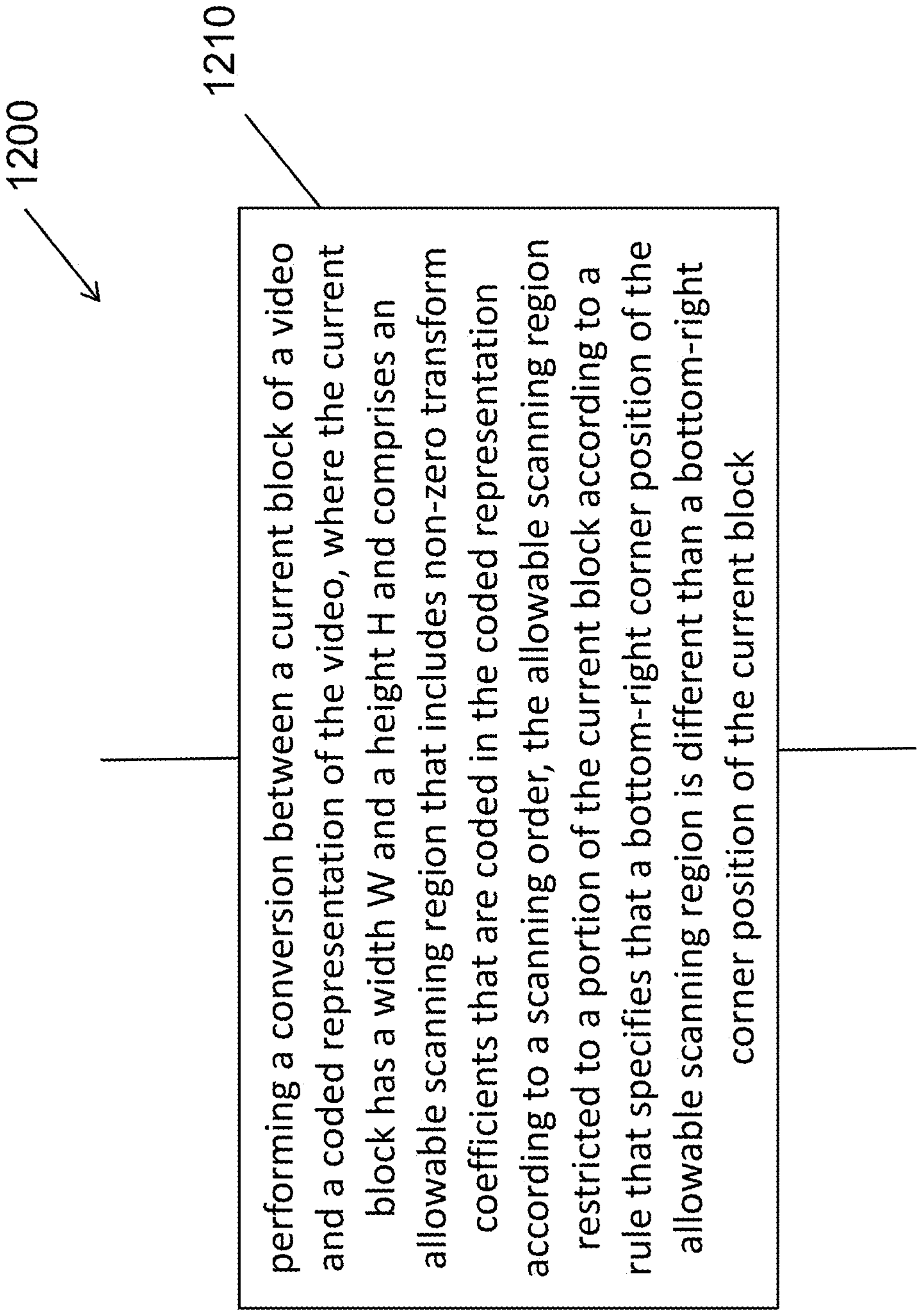
FIG. 12 is a flowchart representation of a method for video processing in accordance with the present technology.

FIG. 12 is a flowchart representation of a method 1200 for video processing in accordance with the present technology. The method 1200 includes, at operation 1210, performing a conversion between a current block of a video and a coded representation of the video. The current block has a width W and a height H and comprises an allowable scanning region that includes non-zero transform coefficients that are coded in the coded representation according to a scanning order. The allowable scanning region is restricted to a portion of the current block according to a rule that specifies that a bottom-right corner of the allowable scanning region is different than a bottom-right corner of the current block.

In some embodiments, an x-coordinate of the bottom-right corner position of the allowable scanning region is within a range of [a, b], where a and b are integers. The parameter b is smaller than (W−1). In some embodiments, ay-coordinate of the bottom-right corner position of the allowable scanning region is within a range of [c, d], where c and d are integers. The parameter d is smaller than (H−1). In some embodiments, a=c=0. In some embodiments, c=d=M−1, M being a positive integer. In some embodiments, a, b, c, and d are smaller than M, M being a positive integer.

In some embodiments, whether the rule is applicable to the current block is based on a dimension of the current block. In some embodiments, the rule is applied to the current block in case W is greater than M or H is greater than M, M being a positive integer. In some embodiments, the bottom-right corner position of the allowable scanning region is signaled in the coded representation is based on a range of allowed positions. In some embodiments, a range of an x-coordinate of the bottom-right corner position of the allowable scanning region is signaled in the coded representation as a group index. The group index is binarized using a truncated unary method in which a max value is set according to min(M, W)−1, M being a positive integer. In some embodiments, a range of a y-coordinate of the bottom-right corner position of the allowable scanning region is represented as a group index. The group index is binarized using a truncated unary method in which a max value is set based on min(M, H)−1, M being a positive integer. In some embodiments, the group index is within a range of [0, 9]. In some embodiments, M=32.

Figure 13:
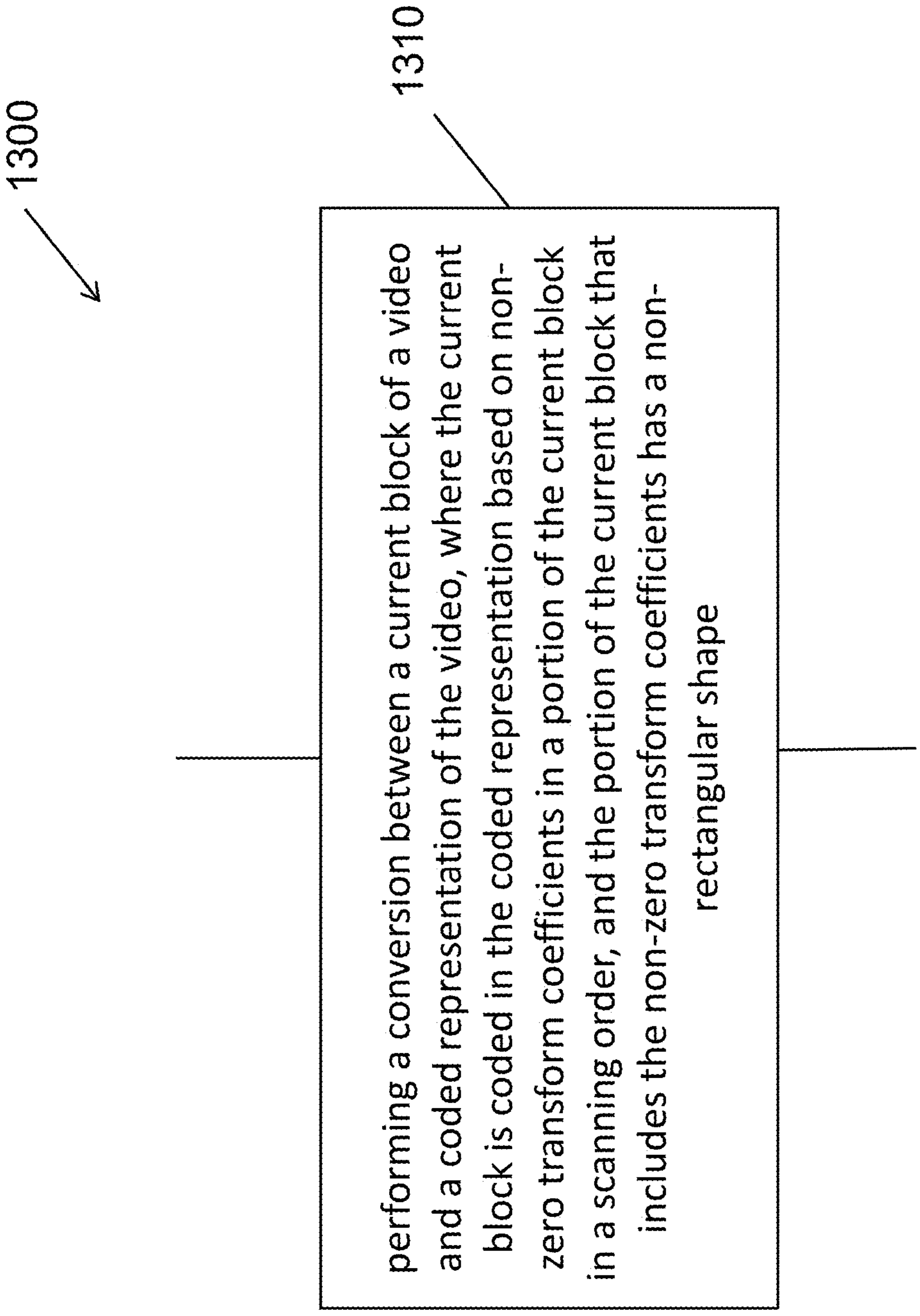
FIG. 13 is another flowchart representation of another method for video processing in accordance with the present technology.

FIG. 13 is a flowchart representation of a method 1300 for video processing in accordance with the present technology. The method 1300 includes, at operation 1310, performing a conversion between a current block of a video and a coded representation of the video. The current block is coded in the coded representation based on non-zero transform coefficients in a portion of the current block in a scanning order, and the portion of the current block that includes the non-zero transform coefficients has a non-rectangular shape.

In some embodiments, the portion has a shape of a wedgelet. In some embodiments, a remaining portion of the current block includes zero transform coefficients. In some embodiments, the zero transform coefficients are not signaled in the coded representation.

Figure 14:
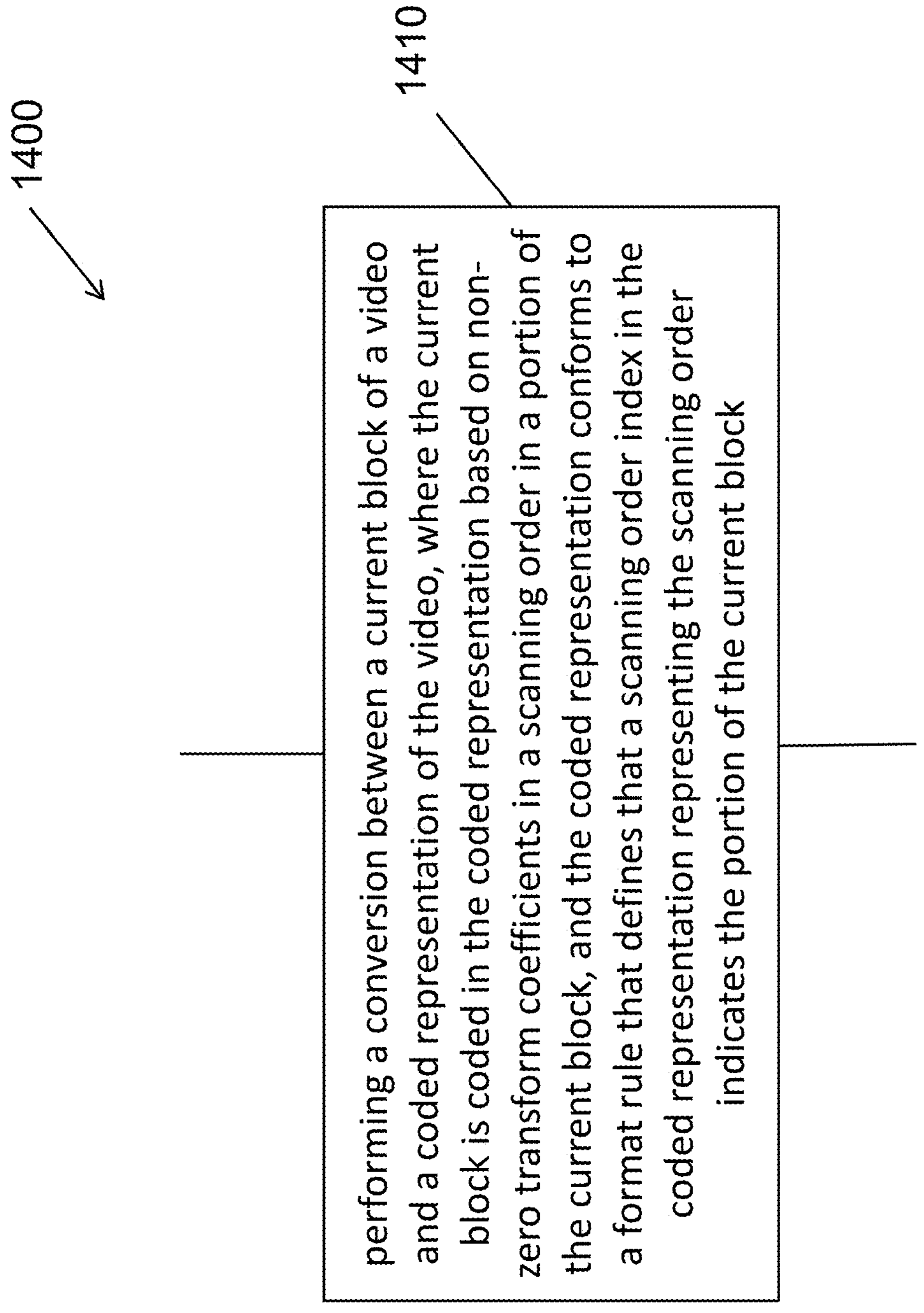
FIG. 14 is another flowchart representation of another method for video processing in accordance with the present technology.

FIG. 14 is a flowchart representation of a method 1400 for video processing in accordance with the present technology. The method 1400 includes, at operation 1410, performing a conversion between a current block of a video and a coded representation of the video. The current block is coded in the coded representation based on non-zero transform coefficients in a scanning order in a portion of the current block. The coded representation conforms to a format rule that defines that a scanning order index in the coded representation representing the scanning order indicates the portion of the current block.

In some embodiments, the scanning order comprises at least one of: a zig-zag scan order, a reverse zig-zag scan order, a raster scan order, or a reverse raster scan order. In some embodiments, the scanning order index is represented as a two-dimensional coordinate (scanX, scanY).

In some embodiments, a transform coefficient at a location in the current block is considered to be a zero transform coefficient in case the location corresponds to an index that is greater than the scanning order index. In some embodiments, a transform coefficient at a location in the current block is considered to be a zero transform coefficient in case the location corresponds to an index that is smaller than the scanning order index. In some embodiments, a transform coefficient at a location in the current block is considered to be a non-zero transform coefficient in case the location corresponds to an index larger than the scanning order index.

In some embodiments, all transform coefficients in locations corresponding to indices that are equal to or smaller than the scanning order index are signaled in the coded representation. In some embodiments, a subset of all transform coefficients in locations corresponding to indices that are equal to or smaller than the scanning order index is signaled in the coded representation.

In some embodiments, a remaining portion of the current block that includes zero transform coefficients is based on a dimension of a video unit. In some embodiments, the video unit comprises a coding unit, a picture unit, a transform unit, or a block. In some embodiments, the scanning order is coded using an arithmetic coding method with one or more context models. In some embodiments, the scanning order is coded using a bypass coding method.

Figure 15:
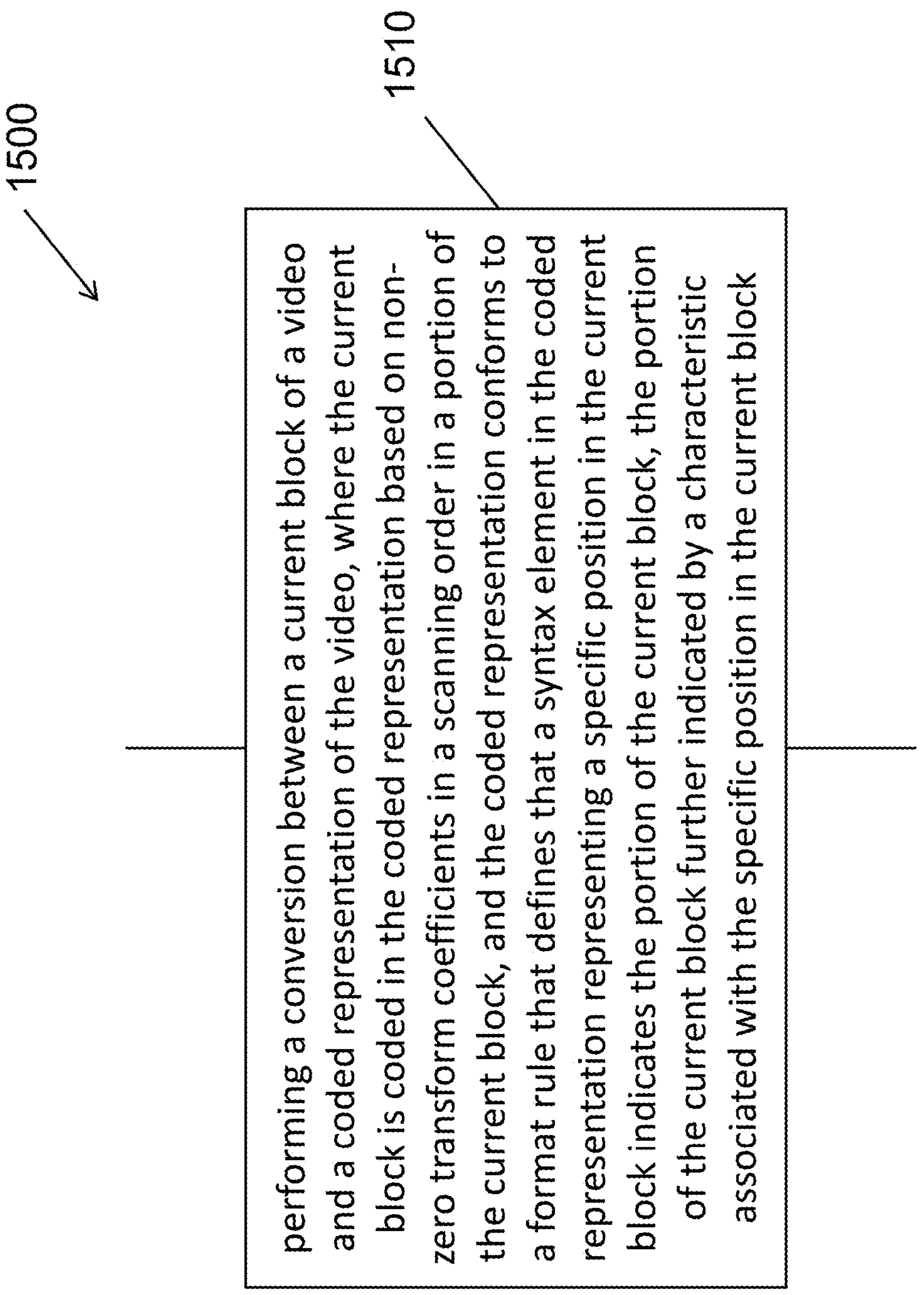
FIG. 15 is another flowchart representation of another method for video processing in accordance with the present technology.

FIG. 15 is a flowchart representation of a method 1500 for video processing in accordance with the present technology. The method 1500 includes, at operation 1510, performing a conversion between a current block of a video and a coded representation of the video. The current block is coded in the coded representation based on non-zero transform coefficients in a scanning order in a portion of the current block. The coded representation conforms to a format rule that defines that a syntax element in the coded representation representing a specific position in the current block indicates the portion of the current block. The portion of the current block is further indicated by a characteristic associated with the specific position in the current block.

In some embodiments, the specific position is represented as a coordinate (x, y). In some embodiments, the coordinate (x, y) corresponds to a scanning order index that indicates the scanning order. The scanning order comprises at least one of: a diagonal scan order, a zig-zag scan order, a reverse zig-zag scan order, or a reverse diagonal scan order.

In some embodiments, the characteristic associated with the specific position comprises a slope of a line that passes through the specific position. In some embodiments, the slope is signaled in the coded representation. In some embodiments, the slope is signaled at a picture level, a slice level, a tile level, a tile group level, a coding tree unit level, a coding unit level, a picture unit level, or a transform unit level. In some embodiments, the slope is predefined. In some embodiments, the slope is either 45° or 135°. In some embodiments, the slope is based on a dimension of a video unit. In some embodiments, the video unit comprises a coding unit, a picture unit, a transform unit, or a block. In some embodiments, the slope is based on a ratio between a width and a height of the video unit. In some embodiments, the slope is equal to arctan(width/height), arctan(height/width), arctan−1(width/height), or arctan−1(height/width). In some embodiments, the slope is based on a prediction mode applicable to the current block that comprises at least one of: an intra prediction mode, an inter prediction mode, or an affine mode.

In some embodiments, the characteristic associated with the specific position comprises a non-linear line that passes through the specific position. In some embodiments, the non-linear line comprises piece-wise linear sections. In some embodiments, all transform coefficients in locations at a first side of the line are considered to be zero transform coefficients. In some embodiments, the locations do not overlap with the line. In some embodiments, the first side comprises a side that is below the line. In some embodiments, at least one coefficient at a location on the line is considered to be a zero transform coefficient. In some embodiments, a coefficient at a location on the line is considered to be a zero transform coefficient in case the location is before a position in the scanning order.

In some embodiments, all transform coefficients in locations at a first side of the line are signaled in the coded representation. In some embodiments, the locations do not overlap with the line. In some embodiments, at least one coefficient at a location on the line is signaled in the coded representation. In some embodiments, In some embodiments, an x-coordinate and a y-coordinate of a bottom-right corner position of the portion of the current block are jointly signaled in the coded representation. In some embodiments, the x-coordinate and the y-coordinate are signaled as a single value in the coded representation. In some embodiments, the x-coordinate and the y-coordinate are jointly signaled in the coded representation according to an order. In some embodiments, the y-coordinate is signaled based on a value of the x-coordinate. In some embodiments, the x-coordinate is signaled based on a value of the y-coordinate. In some embodiments, the order is adaptively variable. In some embodiments, the order varies based on a characteristic of the current block, the characteristic comprising a dimension of the current block.

Figure 16:
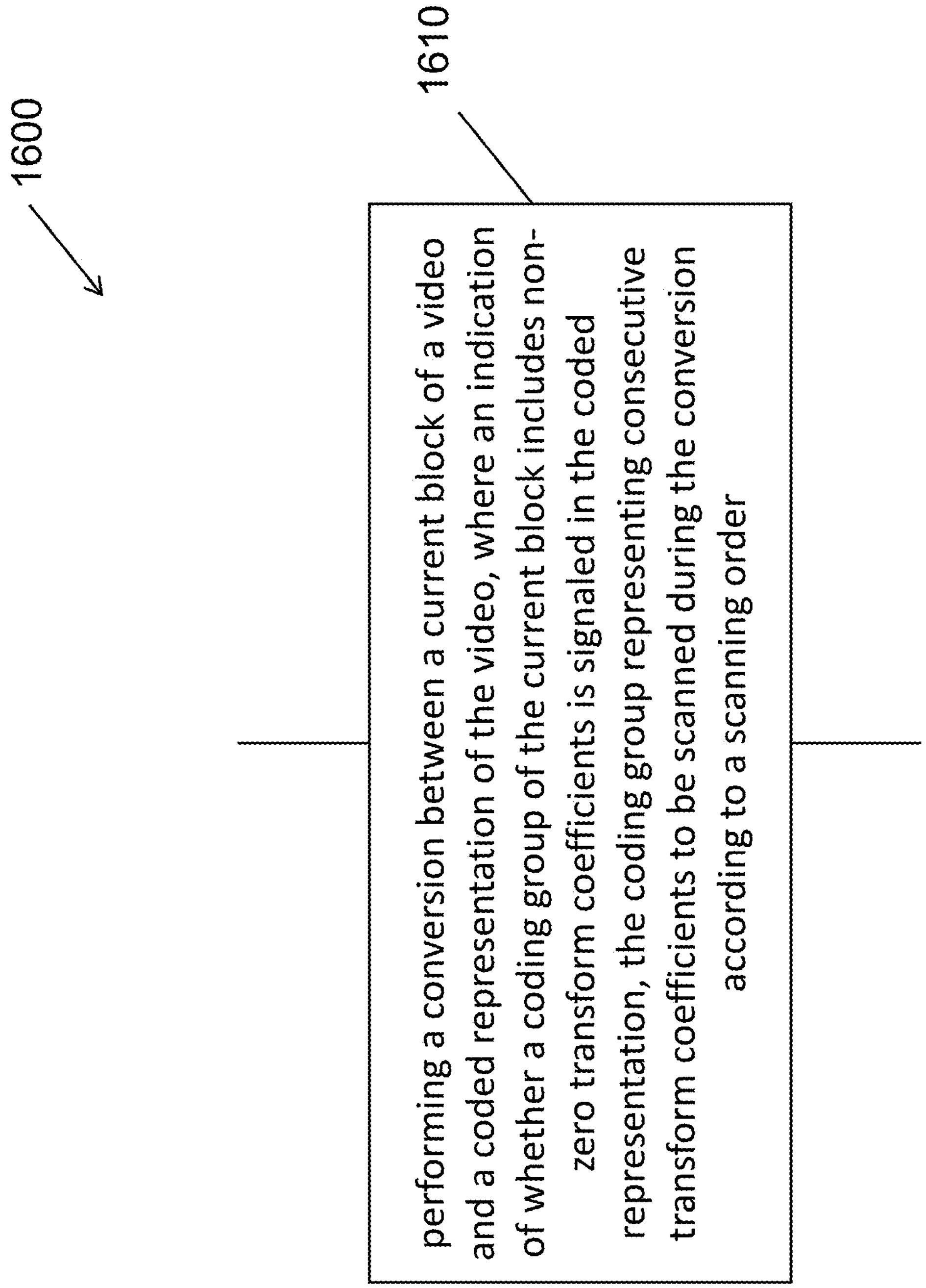
FIG. 16 is another flowchart representation of yet another method for video processing in accordance with the present technology.

FIG. 16 is a flowchart representation of a method 1600 for video processing in accordance with the present technology. The method 1600 includes, at operation 1610, performing a conversion between a current block of a video and a coded representation of the video. An indication of whether a coding group of the current block includes non-zero transform coefficients is signaled in the coded representation. The coding group represents consecutive transform coefficients to be scanned during the conversion according to a scanning order.

In some embodiments, the scanning order comprises at least one of: a diagonal scan order, a zig-zag scan order, a reverse zig-zag scan order, or a reverse diagonal scan order. In some embodiments, the coding group is determined based on N consecutive transform coefficients according to the scanning order, N being a positive integer. In some embodiments, the coding group is determined based on N consecutive transform coefficients according to an order that is different than the scanning order, N being a positive integer. In some embodiments, the current block comprises multiple coding groups, and a first coding group according to the scanning order starts at a last position that includes non-zero transform coefficients. In some embodiments, the current block comprises multiple coding groups, and at least a first coding group or a last coding group according to the scanning order has a different number of transform coefficients compared to remaining coding groups. In some embodiments, the last coding group includes less than N transform coefficients, and each of the remaining coding groups includes N transform coefficients, N being an integer. In some embodiments, the first coding group includes less than N transform coefficients, and the remaining coding groups include K×N transform coefficients, K and N being non-negative integers.

In some embodiments, the current block includes multiple sub-blocks, each having sH rows and sW columns, and the coding group is positioned within a sub-block of the multiple sub-blocks. In some embodiments, the coding group comprises every other row of the sH rows of the sub-block. In some embodiments, the coding group comprises every other column of the sW columns of the sub-block. In some embodiments, the coding group comprises an entirety of the sub-block. In some embodiments, the sub-block is split into two parts based on a checkerboard pattern, and the coding group comprises a first part of the two parts. In some embodiments, a portion of the current block includes the non-zero transform coefficients to be scanned during the conversion according to the scanning order. At least one of the multiple coding groups has a dimension that is different than a dimension of the sub-block due to a dimension of the portion not being an integer multiple of the dimension of the sub-block. In some embodiments, a coding group located at a left boundary or a right boundary of the portion of the current block has a width that is smaller than a width of the sub-block. In some embodiments, a coding group located at a top boundary or a bottom boundary of the portion of the current block has a height that is smaller than a height of the sub-block.

In some embodiments, a portion of the current block includes the non-zero transform coefficients to be scanned during the conversion according to the scanning order. An enlarged area based on the portion is split into the multiple coding groups in case a dimension of the portion is not an integer multiple of the dimension of the sub-block. In some embodiments, the enlarged area has a dimension that is an integer multiple of the dimension of the sub-block. In some embodiments, a difference between a width of the enlarged area and a width of the portion is smaller than a width of the sub-block. In some embodiments, a difference between a height of the enlarged area and a height of the portion is smaller than a height of the sub-block. In some embodiments, N is 8 or 16.

In some embodiments, in case the coding group includes only zero transform coefficients, the zero transform coefficients are not included in the coded representation for a position in the coding group. In some embodiments, the coding group is only used for the indication of the non-zero transform coefficients. In some embodiments, the coding group remains unchanged. In some embodiments, the indication is coded using an arithmetic coding method with one or more context models. In some embodiments, a context model is determined based on a previous indication of a coding group.

In some embodiments, the conversion generates the video from the coded representation. In some embodiments, the conversion generates the coded representation from the video.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention(s) or of what may be claimed, but rather as descriptions of features that may be specific to particular embodiments of particular invention(s). Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:

performing a conversion between a current block of a video and a bitstream of the video, wherein the current block has a width W and a height H;

wherein the current block comprises an allowable scanning region that includes non-zero transform coefficients that are coded in the bitstream according to a scanning order;

wherein in case W is greater than M or H is greater than M, the allowable scanning region is restricted to a portion of the current block according to a rule, and wherein the rule specifies that in case W is greater than M, an x-coordinate of a bottom-right corner position of the allowable scanning region is within a range of [a, b], where a=0 and b=M−1, and in case His greater than M, a y-coordinate of the bottom-right corner position of the allowable scanning region is within a range of [c, d], where c=0 and d=M−1, and M=32;

wherein one or more syntax elements indicating the x-coordinate and the y-coordinate of the bottom-right corner position of the allowable scanning region are included in the bitstream;

wherein a first syntax element indicating the x-coordinate is binarized with a truncated unary method with a max value set to a group index of (min (M, W)−1);

wherein a second syntax element indicating the y-coordinate is binarized with a truncated unary method with a max value set to a group index of (min (M, H)−1).

2. The method of claim 1, wherein the group index is within a range of [0, 9].

3. The method of claim 1, wherein it is a requirement of bitstream conformance that values of one or more syntax elements should be less than M.

4. The method of claim 1, wherein a remaining portion of the current block includes zero transform coefficients and the zero transform coefficients are not included in the bitstream.

5. The method of claim 1, wherein all coefficients within the allowable scanning region are coded in the bitstream.

6. The method of claim 1, wherein the scanning order is a zig-zag scanning order or a reversing zig-zag scanning order.

7. The method of claim 1, wherein the conversion includes encoding the current block into the bitstream.

8. The method of claim 1, wherein the conversion includes decoding the current block from the bitstream.

9. An apparatus for processing video data comprising a processor and a non-transitory memory with instructions thereon, wherein the instructions upon execution by the processor, cause the processor to:

perform a conversion between a current block of a video and a bitstream of the video, wherein the current block has a width W and a height H;

wherein the current block comprises an allowable scanning region that includes non-zero transform coefficients that are coded in the bitstream according to a scanning order;

wherein in case W is greater than M or H is greater than M, the allowable scanning region is restricted to a portion of the current block according to a rule, and wherein the rule specifies that in case W is greater than M, an x-coordinate of a bottom-right corner position of the allowable scanning region is within a range of [a, b], where a=0 and b=M−1, and in case H is greater than M, a y-coordinate of the bottom-right corner position of the allowable scanning region is within a range of [c, d], where c=0 and d=M−1, and M=32;

wherein one or more syntax elements indicating the x-coordinate and the y-coordinate of the bottom-right corner position of the allowable scanning region are included in the bitstream;

wherein a first syntax element indicating the x-coordinate is binarized with a truncated unary method with a max value set to a group index of (min (M, W)−1);

wherein a second syntax element indicating the y-coordinate is binarized with a truncated unary method with a max value set to a group index of (min (M, H)−1).

10. The apparatus of claim 9, wherein the group index is within a range of [0, 9]; and wherein it is a requirement of bitstream conformance that values of one or more syntax elements should be less than M.

11. A non-transitory computer-readable storage medium storing instructions that cause a processor to:

perform a conversion between a current block of a video and a bitstream of the video, wherein the current block has a width W and a height H;

wherein the current block comprises an allowable scanning region that includes non-zero transform coefficients that are coded in the bitstream according to a scanning order;

wherein in case W is greater than M or H is greater than M, the allowable scanning region is restricted to a portion of the current block according to a rule, and wherein the rule specifies that in case W is greater than M, an x-coordinate of a bottom-right corner position of the allowable scanning region is within a range of [a, b], where a=0 and b=M−1, and in case His greater than M, a y-coordinate of the bottom-right corner position of the allowable scanning region is within a range of [c, d], where c=0 and d=M−1, and M=32;

wherein one or more syntax elements indicating the x-coordinate and the y-coordinate of the bottom-right corner position of the allowable scanning region are included in the bitstream;

wherein a first syntax element indicating the x-coordinate is binarized with a truncated unary method with a max value set to a group index of (min (M, W)−1);

wherein a second syntax element indicating the y-coordinate is binarized with a truncated unary method with a max value set to a group index of (min (M, H)−1).

12. The non-transitory computer-readable storage medium of claim 11, wherein the group index is within a range of [0, 9]; and wherein it is a requirement of bitstream conformance that values of one or more syntax elements should be less than M.

13. A method for storing a bitstream of a video, comprising:

generating the bitstream based on a current block of the video, wherein the current block has a width W and a height H; and storing the bitstream in a non-transitory computer-readable recording medium;

wherein the current block comprises an allowable scanning region that includes non-zero transform coefficients that are coded in the bitstream according to a scanning order;

wherein in case W is greater than M or H is greater than M, the allowable scanning region is restricted to a portion of the current block according to a rule, and wherein the rule specifies that in case W is greater than M, an x-coordinate of a bottom-right corner position of the allowable scanning region is within a range of [a, b], where a=0 and b=M−1, and in case H is greater than M, a y-coordinate of the bottom-right corner position of the allowable scanning region is within a range of [c, d], where c=0 and d=M−1, and M=32;

wherein one or more syntax elements indicating the x-coordinate and the y-coordinate of the bottom-right corner position of the allowable scanning region are included in the bitstream;

wherein a first syntax element indicating the x-coordinate is binarized with a truncated unary method with a max value set to a group index of (min (M, W)−1);

wherein a second syntax element indicating the y-coordinate is binarized with a truncated unary method with a max value set to a group index of (min (M, H)−1).

14. The method of claim 13, wherein the group index is within a range of [0, 9]; and wherein it is a requirement of bitstream conformance that values of one or more syntax elements should be less than M.

* * * * *